(12) United States Patent
Fusco et al.

(10) Patent No.: US 9,442,005 B2
(45) Date of Patent: Sep. 13, 2016

(54) NON-CONTACT METHODS OF MEASURING INSERTION LOSS IN OPTICAL FIBER CONNECTORS

(71) Applicant: CORNING OPTICAL COMMUNICATIONS LLC, Hickory, NC (US)

(72) Inventors: Adam Joseph Fusco, Corning, NY (US); Daniel Ohen Ricketts, Corning, NY (US); James Scott Sutherland, Corning, NY (US); Neil David Vance, Addison, NY (US); Elvis Alberto Zambrano, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/447,133

(22) Filed: Jul. 30, 2014

(65) Prior Publication Data
US 2016/0033325 A1 Feb. 4, 2016

(51) Int. Cl.
| | | |
|---|---|---|
| *G01N 21/00* | (2006.01) | |
| *G01J 1/30* | (2006.01) | |
| *G01J 1/02* | (2006.01) | |
| *G01J 1/04* | (2006.01) | |

(Continued)

(52) U.S. Cl.
CPC .............. *G01J 1/30* (2013.01); *G01J 1/0271* (2013.01); *G01J 1/0425* (2013.01); *G01M 11/33* (2013.01); *G02B 6/4225* (2013.01); *G01M 11/30* (2013.01); *G02B 6/385* (2013.01); *G02B 6/3829* (2013.01); *H04B 10/0795* (2013.01)

(58) Field of Classification Search
CPC ........ G01J 1/30; G01J 1/0271; G01J 1/0425; G02B 6/385; G02B 6/4219; G02B 6/422; G02B 6/4225; G02B 6/4227; G01M 11/30; G01M 11/33; H04B 10/10795; H04B 10/07955

See application file for complete search history.

(56) References Cited

U.S. PATENT DOCUMENTS

| 4,281,925 A * | 8/1981 | Forrest ................... G01M 11/33 |
| | | 356/243.1 |
| 5,384,885 A | 1/1995 | Diner ........................... 385/140 |

(Continued)

FOREIGN PATENT DOCUMENTS

| EP | 0957379 A2 | 11/1999 | ............. G02B 6/293 |
| JP | 2005-49407 A | 2/2005 | ............... G02B 6/42 |
| KR | 1235177 B1 | 2/2013 | ............. G02B 6/255 |

OTHER PUBLICATIONS

Patent Cooperation Treaty International Search Report, Application No. PCT/US2015/042346, Nov. 12, 2015, 3 pages.

(Continued)

*Primary Examiner* — Kara E Geisel
*Assistant Examiner* — Hina F Ayub

(57) ABSTRACT

A non-contact method of measuring an insertion loss of a DUT connector is disclosed. The DUT connector has a first ferrule with a first optical fiber and a first end face. The method utilizes a reference connector having a second ferrule with a second optical fiber and a second end face. The method includes: axially aligning the first and second ferrules so that the first and second end faces are confronting and spaced apart to define a gap with an axial gap distance d; measuring values of the insertion loss between the first and second optical fibers for different gap distances d>0; and estimating a value for the insertion loss for a gap distance of d=0 based on the measured values of the insertion loss when d>0.

24 Claims, 25 Drawing Sheets

(51) Int. Cl.
*G02B 6/42* (2006.01)
*G01M 11/00* (2006.01)
*H04B 10/079* (2013.01)
*G02B 6/38* (2006.01)

(56) References Cited

U.S. PATENT DOCUMENTS

| | | | |
|---|---|---|---|
| 5,455,672 | A | 10/1995 | Lamonde et al. ............ 356/73.1 |
| 5,625,450 | A | 4/1997 | Ikeno ........................... 356/73.1 |
| 5,862,250 | A | 1/1999 | Csipkes et al. |
| 6,137,812 | A | 10/2000 | Hsu et al. .......................... 372/6 |
| 7,004,640 | B2 | 2/2006 | Bush et al. ...................... 385/55 |
| 7,719,667 | B2 | 5/2010 | He et al. ........................ 356/73.1 |
| 7,929,123 | B2 | 4/2011 | Caveney et al. ................. 356/43 |
| 8,172,470 | B2 | 5/2012 | Caveney et al. ................ 385/95 |
| 2006/0078264 | A1 | 4/2006 | Lauzier et al. |
| 2007/0192043 | A1* | 8/2007 | Moik et al. ...................... 702/38 |
| 2011/0026851 | A1* | 2/2011 | Ziegler et al. ................. 382/274 |
| 2011/0166139 | A1* | 7/2011 | Barlaam et al. ........... 514/236.5 |
| 2011/0317961 | A1 | 12/2011 | Marino ............................ 385/58 |
| 2016/0061690 | A1* | 3/2016 | Elkins, II ............... G01M 11/33 356/73.1 |

OTHER PUBLICATIONS

A. H. Techranchi and F. E. Seraji, "Exact measurement of insertion loss for optical fiber components," CAOL 2005, Yalta, Crimea, Ukraine, pp. 241-244, Sep. 12-17, 2005.

D. L. Bisbee, "Measurements of loss due to offset and end separations of optical fibers," Bell System Technical Journal, vol. 50, No. 10, 3159-3168, Dec. 1971.

K. Ghadiri, "Fiber optic communication couplers and connectors; Lecture 17," San Jose State University.

M. Tachikura, "Internal loss measurement technique for optical devices equipped with fiber connectors at both ends," Supplement to Applied Optic: Engineering Laboratory Notes, pp. 8056-8057, Dec. 1, 1995.

R. Ednay, "Characterization is key to exploiting fiber potential," Lightwave, pp. 22-23, Apr. 2006.

T. C. Chu and A. R. McCormick, "Measurements of loss due to offset, end separation, and angular misalignment in graded index fibers excited by an incoherent source," Bell System Technical Journal, vol. 57, Now. 3, pp. 595-602, Mar. 1978.

T.-N. Nguyen, et al, "Nondestructive method to measure coupling and propagation losses in optical guided structures," J. Opt. Soc. Am. B, vol. 29, No. 12, pp. 3393-3397, Dec. 2012.

V. Lecoeuche and A. Champavere, " Characterization techniques for installed fibers,"OFC/NFOEC Technical Digest, pp. 1-24, 2012.

W. C. Young, V. Shah, and L. Curtis, "Loss and reflectance of standard cylindrical-ferrule single-mode connectors modified by polishing a 10° oblique endface angle," IEEE Photonics Technology Letters, vol. 1, No. 12, pp. 461-463, Dec. 1989.

W. Joyce and B. DeLoach, "Alignment of Gaussian beams," Applied Optics, vol. 23, No. 23, pp. 4187-4196, 1984.

\* cited by examiner

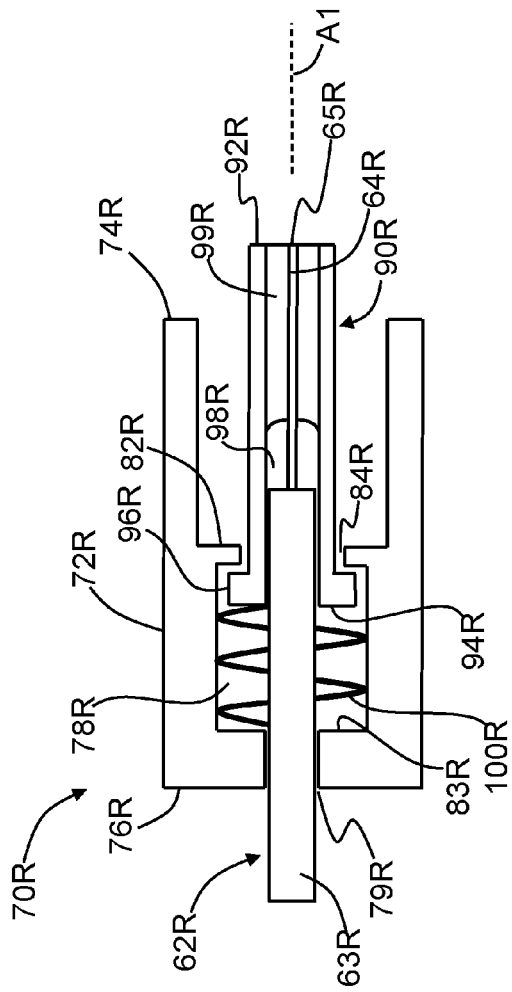
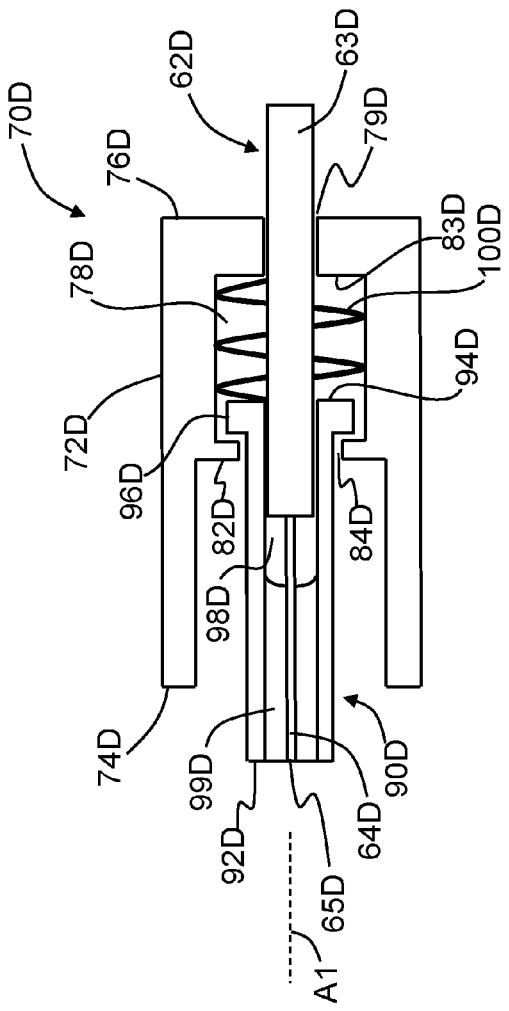
FIG. 2A
FIG. 2B

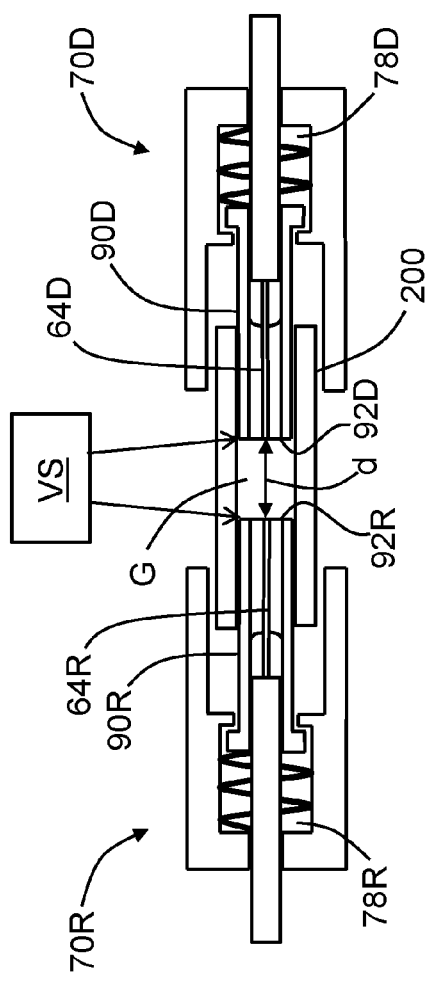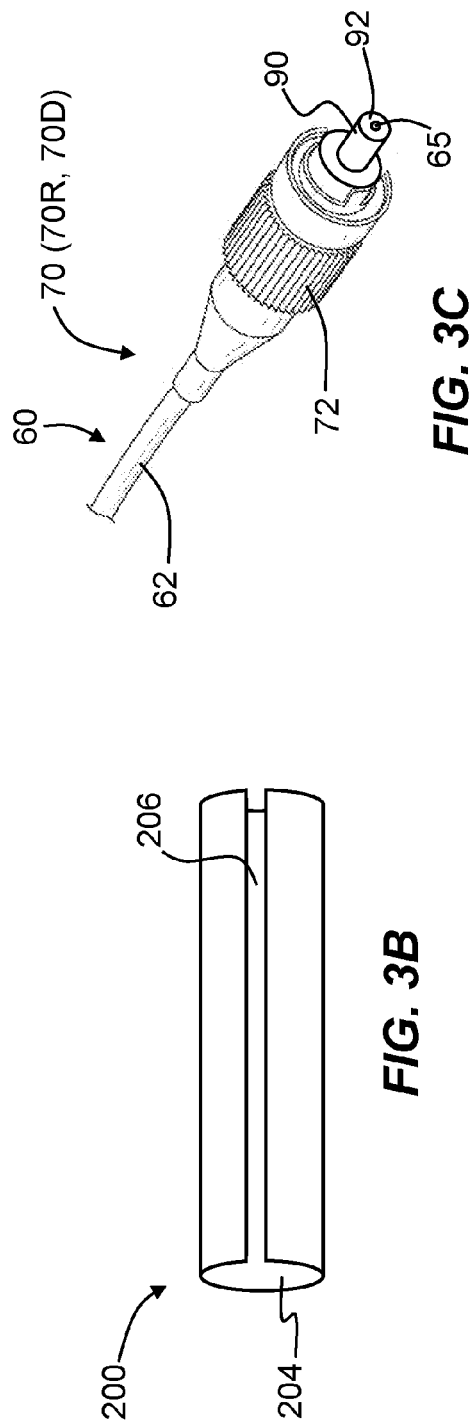

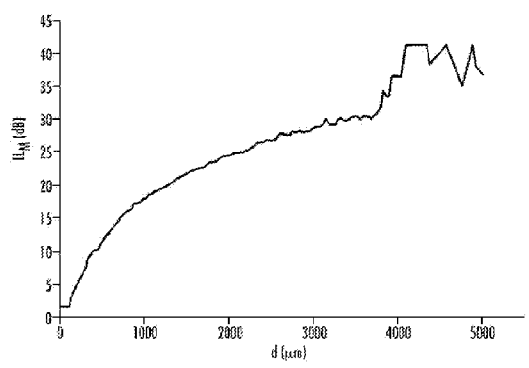 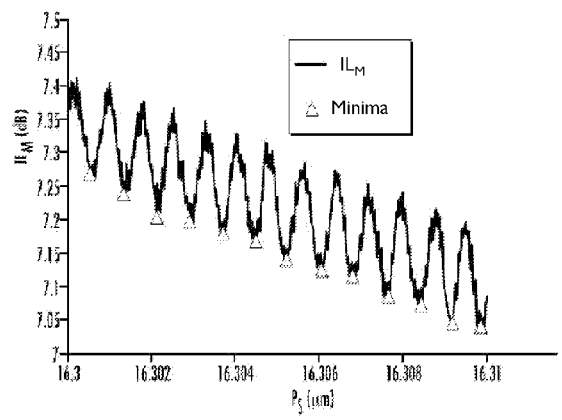
FIG. 5                        FIG. 6

```
cSamplesPerCycle = 20    ' Assume 20 IL measurements per fringe
cSampleDelayCount = cSamplesPerCycle / 2
                 ' Delay ½ fringe before reporting minimum value as fringe minima j = 0            ' Zero count for filtered IL minima points (none found yet)
MinIL = 100000   ' Set initial found MinIL value to very large value
MinPos = 0       ' Set initial found position of found IL value to zero For i = 1 To Count    ' Loop over all measured IL values ' See if current IL value is less than previous minimum IL value
    If IL(i) < MinIL Then
        MinIL = IL(i)    ' If so, at new minimum IL value, so save it
        MinPos = i       ' Also save minimum IL position
    End if ' Report only minimum IL values that are ½ cycle old
    ' Only consider looking for old minimum values if a minimum value has been found
    If MinPos <> 0 Then
        ' If minimum IL value exists, see if it is at least ½ fringe old
        If i > MinPos + cSampleDelayCount Then
            j = j + 1        ' If so, increment found minima IL counter
            MinimaIL(j) = MinIL    ' Save minima IL value using previous found minimum IL value
            MinimaPos(j) = MinPos  ' Also save position of minima IL value ' Set new minimum IL value based on current value and DeltaIL offset to filter noise
            MinIL = MinIL + DeltaIL
            MinPos = 0       ' Set minimum IL position to zero to indicate no minimum IL point found yet
        End if
    End if
Next i
```

FIG. 9

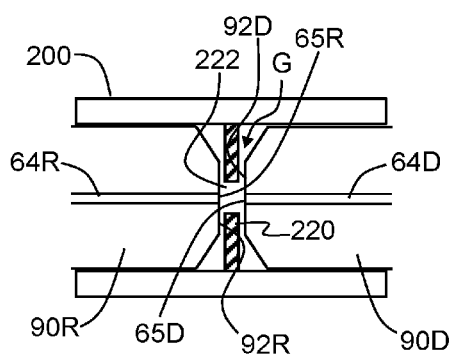
FIG. 15A
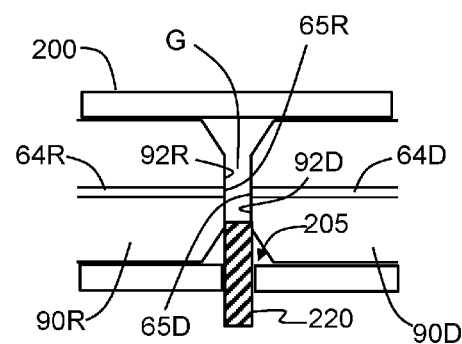
FIG. 15B
FIG. 16
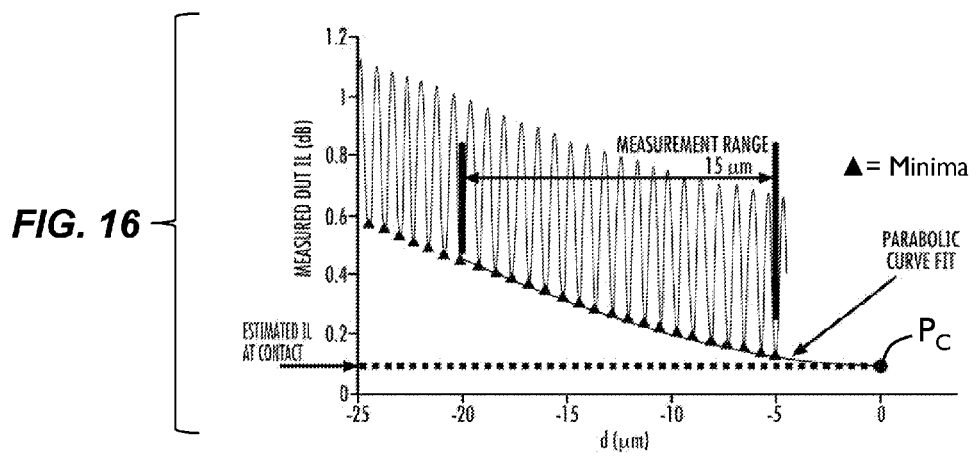

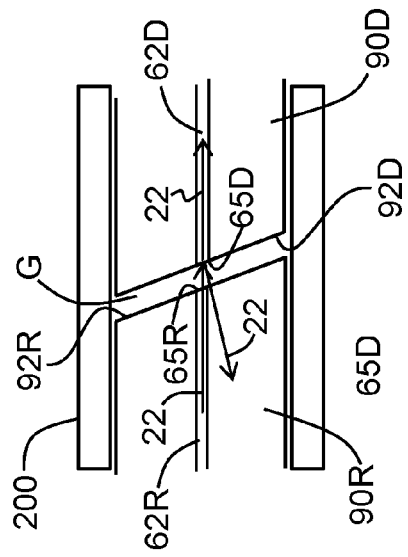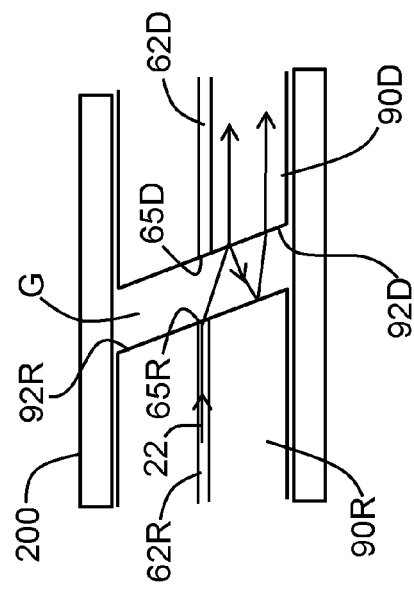

NON-CONTACT METHODS OF MEASURING INSERTION LOSS IN OPTICAL FIBER CONNECTORS

FIELD

The present disclosure relates to optical fiber connectors, and in particular relates to a non-contact method of measuring insertion loss in optical fiber connectors.

BACKGROUND

Optical fiber connectors are used to optically connect one optical fiber to another. One parameter used to measure the quality of the optical fiber connection made by the optical fiber connector is the insertion loss (IL), which is a measure of how much light is lost when passing from one fiber to the other through the optical fiber connector. In some configurations, the optical fiber connector being evaluated is referred to as the device under test (DUT) and the connector to which the DUT is connected is called the reference connector or reference jumper.

Current IL measurement methods used by most optical connector manufacturers require physical contact of the end faces of the DUT and the reference connectors, or the use of an index matching fluid between them. This contact-based method requires cleaning and performing a visual inspection before and after the IL measurement. These steps are time consuming and they reduce productivity.

To reduce the number of reworked or discarded connectors due to insertion loss failures, manufacturers have pursued improvement of IL by reducing core-to-ferrule alignment tolerances, but this have resulted in increased connector cost. Connector components manufacturers appear to have reached the limit of their technology to satisfy a market with continual demand for improvement. With a production of connectors that is only increasing year after year to satisfy the market demand, there is a need for a more efficient, flexible and scalable method for inspecting optical fiber connectors

SUMMARY

Aspects of the disclosure are directed to a non-contact measurement method of the insertion loss of an optical fiber connector. The method reduces the number of scrapped connectors resulting from end face damage and inspection costs associated with specialized reference jumpers that need to be replaced due to wear and tear from contact with the DUT connector. The non-contact inspection methods preserve a pristine surface for both the DUT and reference connectors.

The methods disclosed herein are based on fundamental theories of optical coupling and they reduce measurement variability as compared to the traditional contact methods. The methods disclosed herein also provide additional troubleshooting information that helps isolate sources of loss to individual connector components. An aspect of the method includes rapidly estimating the position where ferrule contact will occur, and techniques for estimating DUT connector IL near-contact via polynomial extrapolation. Analyses of measured IL curves provide dynamic feedback on error conditions, prompting modification of measurement conditions for improved accuracy, and automation of repeat measurements if necessary.

An aspect of the disclosure is a non-contact method of measuring an insertion loss of a DUT connector having a first ferrule with a first optical fiber and a first end face with a reference connector having a second ferrule with a second optical fiber and a second end face. The method includes: Axially aligning the first and second ferrules so that the first and second end faces are confronting and spaced apart to define a gap with an axial gap distance d; measuring values of the insertion loss between the first and second optical fibers for different gap distances d>0; and estimating a value for the insertion loss for a gap distance of d=0 based on the measured values of the insertion loss when d>0. An aspect of the method includes extrapolating the insertion loss measurement data to obtain the insertion loss value at d=0, i.e., the condition under which the reference and DUT connectors would be in contact.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIGS. 2A and 2B are close-up, cross-sectional views of example reference and DUT optical fiber connectors, respectively, wherein the ferrule and the connector housing of each connector are mechanically decoupled through the use of a resilient member;

FIG. 3A is a close-up view of the portion of the measurement system of FIG. 1, wherein the reference connector and the DUT connector are inserted into opposite ends of an alignment member so that the ferrule end faces are spaced apart and facing each other to define a gap having an axial gap distance d, which can be varied by moving the reference connector ferrule;

FIG. 3B is a side view of an example alignment member in the form of a sleeve having a "C" shape;

FIG. 3C is an elevated view of an example connector that can be the reference or the DUT connector;

FIG. 5 is a plot of the measured insertion loss $IL_M$ (dB) versus the gap distance d (μm) using the measurement system of FIG. 1;

FIG. 6 is a plot of the measured insertion loss $IL_M$ (dB) versus the stage position $P_S$ (μm) showing the oscillatory nature of the measured insertion loss and also showing the $IL_M$ minima of the oscillatory curve (triangles);

FIG. 9 is Example Visual Basic code that represents instructions that can be embodied in a computer-readable medium in the system computer or controller for implementing an $IL_M(z)$ minima function with the $\Delta IL$ offset option;

FIGS. 15A and 15B are close-up cross-sectional views of the reference and DUT ferrules of the reference and DUT connectors showing two examples of employing a mechanical insert to define the gap distance d;

FIG. 16 is a plot of the measured insertion loss $IL_M$ (dB) versus the gap distance d (μm) using a parabolic curve fit for estimating the DUT insertion loss at the (estimated) contact position using a set of near-contact IL minima points;

FIG. 27 is a cross-sectional view of example APC reference and DUT connectors as operably arranged within an alignment member;

FIG. 28 is similar to FIG. 27 and shows a larger gap between the fiber end faces.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

In the discussion below, the term "optical fiber connector" is referred to as "connector" for short.

Also in the discussion below, IL stands for "insertion loss" while $IL_M$ stands for "measured insertion loss." Further, $P_S$ stands for the "stage position," and $P_C$ stands for the contact position of the stage when the ferrule end faces of the DUT and reference connectors are in contact, i.e., for the condition d=0.

It is noted that discussion of the reference and DUT connectors being in contact refers to aspects of the method where the insertion loss is estimated for the condition wherein the DUT and reference connectors would be in contact, and that the two connectors are not actually brought into contact during the method.

The non-contact methods disclosed herein are presented by way of example and ease of discussion by considering SMF-28 single-mode fiber SC-UPC type connectors such as shown in FIGS. 2A and 2B, introduced and discussed below. However, the methods are broadly applicable to a wide range of optical interconnection configurations and device types, including: connectors with any type of single-mode fiber, such as SMF-28, DS and LS; connectors with any type of multimode fiber, such as for 50 μm and 62 μm core diameter, step index and graded index core profiles; connectors with flat (UPC) or angled (APC) ferrule end faces; connectors that use any kind of passive alignment feature (SC, FC, ST or LC type connector) or member that maintains core pin and hole-based connectors, such as MTP and MT-RJ configurations.

In addition, the methods disclosed herein are applicable to connectors attached to any type of photonic device besides optical fibers, such as passive devices like jumper cables, splitters, filters, etc., and active devices like laser sources, switches, modulators, etc. The methods can also be applied to non-connectorized devices, such as bare fibers, large diameter fibers, multicore fibers, and fibers in fiber splicers.

Non-Contact Measurement System

Figure 1:
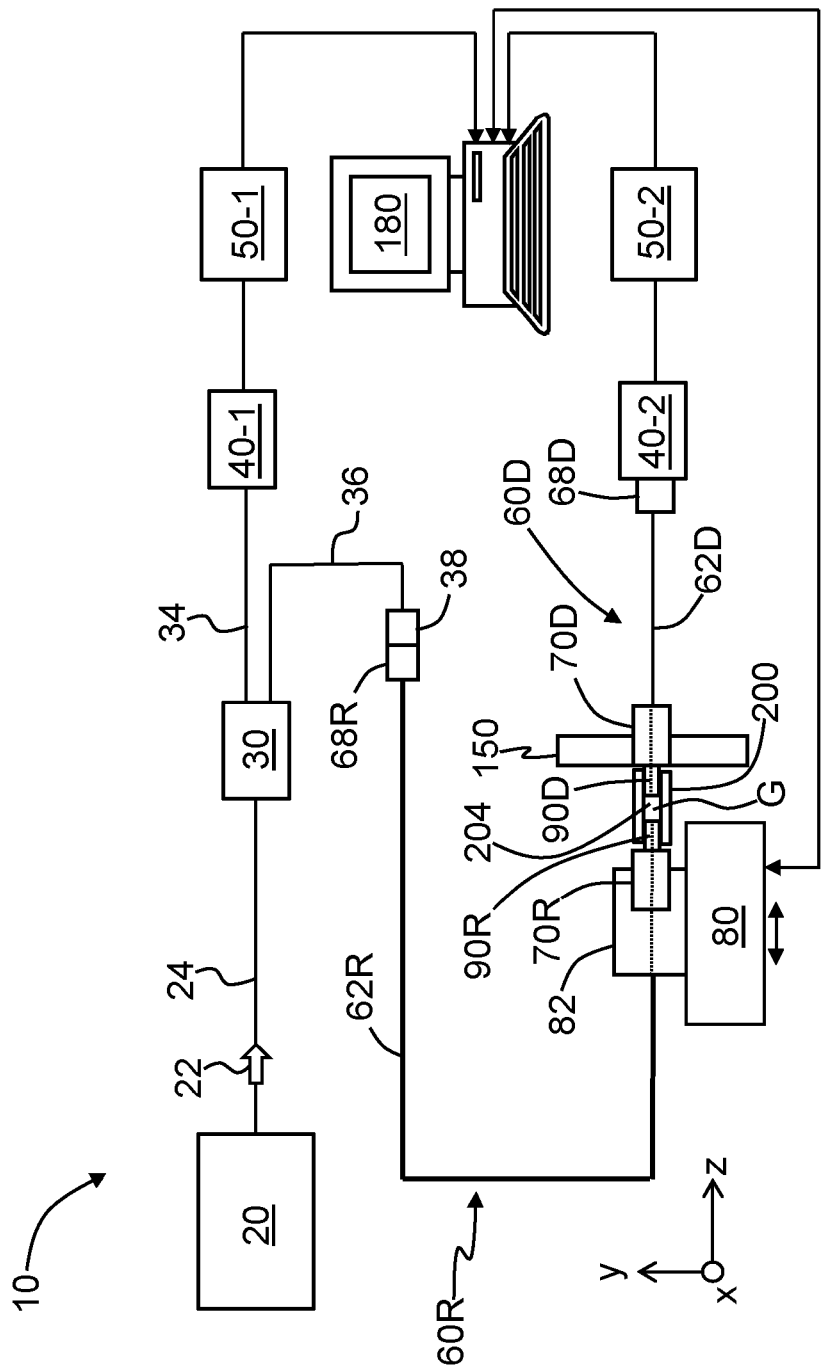
FIG. 1 is a schematic diagram of an example measurement system for measuring the insertion loss between two optical fiber connectors.

FIG. 1 is a schematic diagram of an example non-contact insertion loss measurement system ("system") 10 for carrying out the IL measurement methods disclosed herein. System 10 includes a laser source 20 that emits light 22 of wavelength λ, which can be any of the wavelengths used in optical communications, e.g., 850 nm, 1330 nm, 1550 nm, etc. Laser source 20 is optically coupled to a splitter 30 via an optical fiber section 24. The splitter 30 is optically coupled to a first detector 40-1 (e.g., via an optical fiber section 34). First detector 40-1 in turn is electrically connected to a first power meter 50-1. In an example, splitter 30 is a 50:50 splitter.

The splitter 30 is also optically connected to a reference jumper cable 60R, e.g., via an optical fiber section 36 that includes a connector 38. Reference jumper cable 60R includes an optical fiber 62R that includes at one end a connector 68R that engages with connector 38 of optical fiber section 36, and includes at the other end a connector 70R, which is referred to hereinafter as the "reference connector," and which is described in greater detail below. The reference connector 70R is supported by a support fixture 82 of a computer-controlled z-axis stage ("stage") 80, which is configured to move the reference connector in the z-direction in precise amounts, as indicated by the double arrow below the stage 80. As described below in connection with FIG. 2A, the reference connector 70R includes a ferrule 90R that supports a bare section 64R of optical fiber 62R, with the bare section 64R having an end face 65R at the ferrule front end (or end face) 92R.

System 10 also includes a mounting fixture 150 that operably supports a DUT connector 70D that is part of a DUT cable 60D having a DUT fiber 62D. The DUT fiber 62D is optically connected to a second detector 40-2 via a connector 68D. The second detector 40-2 is electrically connected to a second power meter 50-2. The first and second power meters 50-1 and 50-2, along with the computer-controlled z-axis stage 80 are operably connected to a controller (or computer) 180.

System 10 also includes an alignment member 200 with an interior 204. In an example, alignment member 200 is in the form of a sleeve or tube. The respective ferrules 90R and 90D of the reference and DUT connectors 70R and 70D are inserted into opposite ends of alignment member 200 so that the respective ferrule front ends 92R and 92D (and thus the respective fiber end faces 65R and 65D) face one another (i.e., are confronting) and define a gap G, wherein the end faces are spaced apart by an axial distance d, referred to below as the gap distance.

FIGS. 2A and 2B are close-up, cross-sectional view of example reference and DUT connectors 70R and 70D, respectively. In the discussion above and below, connector components of reference connector 70R include an "R" in the reference number while connector components of DUT connector 70D include a "D" in the reference number. When referring to a connector 70 in general (i.e., elements/aspects common to reference connecter 70R and DUT connector 70D), the "D" and "R" suffix in the reference numbers is omitted. The same applies to optical fiber 62R and DUT fiber 62D.

Connector 70 includes a housing 72 having a central axis A1, an open front-end 74, a back end 76 and an interior chamber 78 adjacent the back end. Housing back end 76 includes an aperture 79. The interior chamber 78 is defined in part by front and rear chamber walls 82 and 83 within housing 72, with the front chamber wall having an aperture 84. Connector 70 also includes the aforementioned ferrule 90, which has a front end (end face) 92 and a back end 94 having a flange 96. The ferrule 90 has a longitudinal bore 98 that extends from back end 94 to front end 92 and that supports the bare section 64 of optical fiber 62.

The ferrule 90 is arranged in housing 72 along central axis A1, with the flanged back end residing with interior chamber 78 and the ferrule extending through aperture 84, with the ferrule front end 92 extending from housing open front end 74. The optical fiber 62 includes a jacketed section 63 and the bare section 64. The optical fiber 62 passes through aperture 79 at the back end 76 of housing 72 and extends through interior chamber 78 and into ferrule 90, with the jacketed section 63 extending partway into ferrule bore 98. The bare fiber section 64 extends to the front end 92 of ferrule 90 and is supported within the ferrule bore 98 by a bonding material 99. A resilient member 104 (e.g., a spring) resides in interior chamber 78 and contacts the rear chamber wall 83 and the flanged back end 94 of ferrule 90. In connector 70, ferrule 90 is mechanically decoupled from connector housing 72 by resilient member 100.

FIG. 3A is a close-up view of the reference connector 70R and DUT connector 70D operably arranged with their respective ferrules 90R and 90D inserted into the opposite ends of alignment member 200. When an axial compression force is applied on ferrule front ends 92R and 92D, the respective resilient members 100 compress, and the ferrules retract into their respective interior chamber 78R and 78D.

FIG. 3B is a side view of an example alignment member 200 in the form of a sleeve having a "C" shape that is defined in part by a slot 206. In an example, the C-shaped sleeve is made of ceramic and is used for passive alignment. FIG. 3C is an elevated view of an example connector 70 that can be the reference or DUT connector.

In conventional insertion loss measurement methods, when the reference and DUT connectors 70R and 70D are inserted into the opposite ends of alignment member 200 and moved toward each other, the respective ferrule end faces 92 meet within the member and are forced into contact (i.e., the gap distance d becomes zero). In this case, an additional axial compression force is typically applied to drive the ferrule end faces 92R and 92D into firm contact. This additional force leads to additional compression of resilient members 100R and 100D.

System 10 is configured to perform a non-contact insertion loss measurement and provide for precisely adjusting the gap distance d of the ferrule front ends 92R and 90D (and thus the respective fiber end faces 65R and 65D) of the reference and DUT connectors 70R and 70D. In the example configuration of system 10, the reference connector 70R is mounted on stage 80 using fixture 82 so that the stage axis (i.e., the z-axis) is substantially parallel to the connector ferrule axis. The DUT connector 70D can be fixed in place during the measurement method. In an example configuration of system 10, the DUT connector 70D is mounted in fixture 150 positioned on a front panel (not shown) of the measurement system while the reference connector 70R is mounted on stage 80 using the aforementioned fixture 82 (FIG. 1).

The DUT connector 70D may be attached to mounting fixture 150 by gripping a portion of ferrule 90D or alternatively by gripping a portion of the connector housing 72D. Gripping ferrule 90D may be difficult because of its small size, and because at least a portion of the ferrule must also be inserted into alignment member 200. Therefore in the most general case, the DUT connector 70D is gripped by making contact with molded features (not shown) of its connector housing 72D. These features may include molded depressions and/or tabs that are normally engaged by adapter fingers or clips to retain the DUT connector inside an adapter and hold the two connector end faces in contact.

In an example, ferrule 90D of the DUT connector 70D is retained within a cylindrical cavity (not shown) formed in mounting fixture 150. In an example, an aperture on the DUT connector mount retains the ceramic member on the reference connector ferrule when the DUT connector is removed from the DUT connector mount.

System 10 is configured to measure the amount of light 22 coupled from reference optical fiber 64R associated with reference connector 70R into the DUT optical fiber 64D associated with DUT connector 70D as the respective ferrules 90R and 90D are moved closer to each other within alignment member 200 (FIG. 3). In the operation of system 10, light 22 from light source 20 is directed though splitter 30 so that a portion of the light may be monitored over time at first detector 40-1. The other portion of light 22 from splitter 30 is directed to reference jumper cable 60R via a low-back-reflection optical connector 68. This light passes 22 through the reference jumper cable 60R, exits bare fiber 64R at its end face 65R and then propagates through gap G over the distance d to DUT connector 70D and to the end face 65D of DUT bare fiber 64D. The coupled light then propagates down the DUT optical fiber 62D of the DUT jumper cable 60D and exits at a second DUT connector 68D and is then measured by second detector 40-2.

System 10 samples the two measured power levels $P_1$ and $P_2$ at detectors 40-1 and 40-2, respectively, and calculates a measured insertion loss IL, defined as $IL_M = -10 \log_{10}(P_2/P_1)$. This calculation takes place in computer (controller) 180. This measured insertion loss value $IL_M$ is repeatedly taken over the course of the measurement process for different values of d, with the measured values correlated with corresponding time and/or stage position measurements and/or values of the gap distance d.

A suitable light source 20 is a laser source, such as the Greenlee Model 580XL, that operates at either 1550 nm or 1330 nm. Suitable first and second detectors 40A and 40B are Newport 918-IS-I, 850-1600 nm broad-area detectors. Suitable first and second power meters 50A and 50B are Newport 1936-R power meters having a single channel and a USB interface. A suitable splitter 30 is the ThorLabs 2×2 Single Mode Fused Fiber Optic Coupler/Tap. Suitable fixtures 82 and 150 for holding reference connector 70 and DUT connector 70 include Newport 561-SCH SC Connector Holders. A suitable stage 80 is the Newport 562-XYZ ULTRAlign™ Fiber Alignment Stage, and motorized stage actuators include the Newport LTA-HS Actuator. An example motion stage controller is the Newport ESP-301 3-Axis Motion Controller. Other suitable elements of system 10 include Analog USB Chassis from National Instruments, NI cDaq-9184, an Analog Module from National Instruments, NI USB-9239, 4-channel input. Computer 180 can be PC controller such as the Advantec PC that runs LabView 2012 SP2 and Windows Office 2010.

In an example, reference connector 70R is generally retained on stage 80 using fixture 82, which in an example grips connector housing 72R instead ferrule 90R. Accordingly, one concern is that a precise displacement of stage 80 and connector housing 72 will not result in an equally precise displacement of the ferrule end face 92R within the interior 204 of alignment member 200. For example, excessive friction at the ferrule/member interface could cause gripping and slipping that could decorrelate stage motions and ferrule motions. If reference ferrule 90R gets stuck in one position within alignment member 200, additional motion of stage 80 will tend to further compress the alignment member until static friction at the ferrule/member interface is overcome. At this point, the reference ferrule 90R slides rapidly within interior 204 of alignment member 200, possibly resulting in a short-lived high velocity that prevents accurate measurement of optical coupling between the reference and DUT connectors 70R and 70D.

Experiments have been carried using system 10 to examine the correlation between the motion of connector housing 72R via stage displacement and the motion of ferrule 90R within a ceramic alignment member 200. It was found that initial stage displacement does not result in ferrule motion, as the resilient member 100R must be compressed sufficiently to overcome dynamic friction at the ferrule/member interface. For an SC reference connector 70R, this compression distance has been measured to be around 100 µm.

Once the reference connector's resilient member 100R has been sufficiently compressed, experimental results indicate that as long as the stage velocity v exceeds a minimum value (e.g., 3 µm/sec for an SC ferrule in an SC alignment member), static friction effects are overcome and the ferrule 90R slides smoothly within interior 204 the alignment member 200 at a velocity that is identical to the stage velocity v. If the stage velocity v is less than the minimum velocity value, the ferrule 90R can tend to grip and slip within alignment member 200. A high correlation between stage and ferrule position is needed for accurate optical power measurements, especially at high velocities where interference fringe resolution may be limited by detector sample rate.

Summary of the Measurement Method

System 10 is used to carry out the method of measuring the IL of a DUT connector 70D. In an example, the measurement method involves the following main steps:
1) Inserting a DUT connector 70D into mounting fixture 150 of system 10.
2) Coaxially aligning the DUT connector ferrule 90D with a reference connector ferrule 90R using passive alignment via alignment member 200.
3) Reducing the axial separation d of the connector ferrule end faces 92R and 92D while measuring optical power coupled between the reference and DUT connectors 70R and 70D
4) Using the measured optical power coupling data for different distances d (or different stage positions $P_S$) to predict the axial position $P_C$ where the connector ferrules will make contact.
5) Reducing connector ferrule axial distance d until a target near-contact axial distance d is reached.
6) Using measured optical power coupling data to estimate the connector attenuation or insertion loss for the condition where the DUT connector 70D would be in contact with the reference connector 70R.

In the jumper cable manufacturing process, the IL for each connector 70 must be characterized individually. The IL measurement system 10 described above provides two connector ports that receive the connectors on the two ends of a single jumper cable. A first connector port is designated the measurement port, and at this port the IL of the inserted connector is characterized. The second connector port is designated the detector port. This port is required to measure optical power coupled into the optical fiber via the measurement port.

To characterize the IL for a jumper cable, both connector ends must be measured. If one jumper cable connector is designated connector A and the other jumper cable connector is designated connector B, the jumper cable is characterized in two steps:

1) Measure IL of jumper cable connector A by inserting it into the measurement port, and insert jumper cable connector B into the detector port
2) Measure IL of jumper cable connector B by inserting it into the measurement port, and insert jumper cable connector A into the detector port System 10 can also be used to characterize devices that provide a 1:N optical split function, where the N splitter output connectors are attached to the measurement system in N separate measurements.

After each connector IL measurement, measurement system 10 can also make an estimate of IL associated with the jumper cable optical link between connectors. Unless otherwise noted, a DUT measurement refers to the IL measurement performed on a single jumper cable connector.

To measure each jumper cable connector IL, the user must first remove both connector dust caps and clean both connector ferrule ends to remove unwanted debris that may remain there after previous processing steps. The cleaning process may be manual or automated. After cleaning it is critical that the fiber and ferrule end are visually inspected to ensure that all debris has been removed. While the currently described near-contact measurement approach prevents connector ferrules from touching each other within the measurement system, the gap between the DUT connector ferrule end and the reference connector ferrule end within the measurement system can be small, such as 5 µm. Since this gap size can be smaller than the size of many common debris items (e.g., lint, dirt, dust), debris on the fiber end can inhibit correct measurement of DUT IL. Debris can also block light transmission into the DUT connector fiber core, resulting in an inaccurate measurement of DUT IL.

After connector cleaning, the jumper cable connectors are manually inserted into the measurement system measurement and detector ports. The interior of the measurement system can be held at a slight positive pressure relative to the exterior to prevent airborne debris from the surrounding environment from entering the measurement system via the open measurement and detector ports. It may be important to mount the measurement system on a vibration isolation stage to minimize the influence of environmental vibrations on optical measurements.

Jumper cable connectors may be retained in the measurement system ports via passive clips integral to the ports that mate with depressions on the connector bodies (similar to the way connectors are currently held in adapter housings). Alternatively, the jumper cable connectors may be contacted by one or more mechanically actuated arms, grippers or pistons that engage with connector body depressions to hold the connector body in a known position during DUT measurement.

The connector gripping action can be single-sided, so that the connector is forced into contact with a reference surface that is internal to the port housing. Alternatively, the connector gripping action can be double-sided, so that the connector body is centered within the port housing. The gripping action can be provided in a single lateral direction (such as in the x-direction, where the z-direction is the fiber axis), or in two lateral directions (such as the x-direction and the y-direction). The mechanical actuation motion may be provided by a computer-controlled pneumatic system.

The reference connector may be mounted within the measurement system enclosure using passive or actuated mounting methods similar to the ones used to grip the DUT connector body. This allows users to periodically inspect and replace reference connectors and members quickly and easily.

The measurement approach requires coaxial alignment of the DUT connector ferrule with a reference connector ferrule that is mounted within the measurement system. In the passive alignment approach described here, the cylindrical sidewall surfaces of the connector ferrules are aligned with each other by forcing them into contact with one or more common alignment surfaces.

A common alignment surface provides at least one region where all the points along the surface fall along a straight line. This straight line region of the common alignment surface is oriented parallel to the axis of each connector ferrule. Three straight line regions, on one or more common alignment surfaces, are required to bring the two connector ferrules into coaxial alignment.

Since the initial orientation of the DUT connector ferrule may vary slightly from insertion to insertion, it is desirable that at least two and preferably three of the straight line regions are of an extended width to accommodate ferrule lateral position uncertainty. For example, the straight line regions should provide surface contours perpendicular to the straight line that are invariant along the length line for at least some perpendicular distance away from the line. The resulting surface may be flat, concave or convex, with concave surfaces generally preferable to convex for improved lateral centering of connector ferrules on fiber insertion. For example, the common alignment surface may be provided by two or more rectangular flat surfaces, or a single cylindrical member.

The three or more straight line regions provided by the one or more common alignment surfaces should be arranged so that they make contact with the connector ferrules at locations that are no more than 180 degrees apart from each other, and preferably no more than 120 degrees apart from each other. This configuration ensures that the connector ferrule sidewall surfaces are forced into contact with the straight line regions in such a way that the two connector ferrules become coaxially aligned with each other.

Since the connector ferrule ODs (Outside Diameters) are known to vary by small amounts (e.g., 0.5 µm to 1.0 µm), it is desirable that at least one of straight line regions provided by the one or more common alignment surfaces be deformable or mounted on a deformable material or mechanical arm. In the event that a connector ferrule with a large OD is inserted into the common alignment surface region of the measurement system, it is important that at least one of the straight line regions accommodate interference with the connector ferrule by being displaced out of the way. The reaction force associated with the straight line region displacement ensures that the connector ferrules are displaced relative to each other so that they come into coaxial alignment.

In the course of measuring multiple connectors, it is also likely that the connector ferrule OD will not always perfectly match the reference connector ferrule OD. Therefore it is desirable that at least one of the straight line regions or its mounting structure be allowed to deform to accommodate the difference in ferrule OD.

If the straight line region is completely rigid this deformation would result in a linear variation in straight line region displacement moving along the DUT/reference ferrule common axis. In this case the ferrule with the smaller OD might be free to be laterally displaced relative to the larger OD ferrule, resulting in a small variation in measured IL near contact. It may be desirable to provide a lateral bias force on one or both connector ferrules to ensure that if the ferrule ODs are mismatched the coaxial ferrule alignment always takes place with a lateral offset that remains relatively invariant over the various steps of the measurement process.

If the straight line region is formed in a material that is slightly deformable, the resulting straight line region would deviate from its straight line form around the junction of the two connector ferrules, resulting in a potentially modest surface discontinuity. This straight line region deformation would minimize the ferrule lateral misalignments discussed immediately above. To maximize coaxial alignment of the two ferrules, it is desirable that two or preferably three of the straight line regions or their mounting structures deform to self-center ferrules with different ODs.

C-shaped ceramic alignment members 200 such as shown in FIG. 3B are currently used for coaxial alignment of connector ferrules within adapters. The maximum ID of alignment member 200 is designed to be less than the minimum OD of any connector ferrule 90. When a connector ferrule 90 is inserted into alignment member 200, the alignment member material deforms so that, when fully inserted, at least three lines of contact exist between the member inner surface and the ferrule outer sidewall surface. In practical configurations, the contact occurs over a long but narrow rectangular area due to deformation of the alignment member. Since the alignment member 200 is displaced outward from the shape it holds at rest, a reaction force is applied over the rectangular contact areas that bring the two connector ferrules 90R and 90D into coaxial alignment.

Uncertainty in the Estimation of the Gap Distance d

In an example of the near-contact measurement methods disclosed herein, the separation distance d or gap distance between the two connector ferrule end faces 90R and 90D is reduced from an initial large distance (e.g., >2000 μm) to a smaller distance (e.g., 5 μm), where the ferrule end faces do not touch (i.e., d is not allowed to become zero). The system 10 maintains an accurate estimate of the gap distance d to prevent inadvertent ferrule-to-ferrule contact. The uncertainty associated with the estimated gap distance d must always be less than the actual gap distance to ensure that the ferrules end faces never touch.

A relatively large uncertainty in estimate of the gap distance d is permissible when the ferrules 90R and 90D are separated by large distances (e.g., >1000 μm), as is the case during early measurement stages. Therefore the gap estimation methods that can provide rapid estimates of gap distance d are preferred, even if these methods provide limited accuracy (e.g., an uncertainty in gap distance of 30 μm to 100 μm).

A relatively small uncertainty in the estimate of the gap distance d is required when the ferrules are separated by small distances (e.g., <20 μm), as is the case during late measurement stages. Therefore, the gap estimation methods that can provide accurate estimates of gap distance are preferred, even if these methods require additional time (e.g., an uncertainty in gap distance of <3 μm).

To minimize total connector IL measurement time, the measurement can be carried out in several different steps, where: 1) early measurements steps rapidly traverse relatively large distances and make relatively coarse estimates of gap distance, and 2) late measurements steps traverse relatively small distances more slowly and make relatively accurate estimates of gap distance.

In an example of the IL measurement method, each measurement step starts with an initial estimate of the gap distance d. The first measurement starts with a conservative estimate after initial connector insertion into the measurement system based on one or more of the following: a) Known connector geometry (length of ferrules, positions of insertion stop features on connector body; b) design of the connector mounting fixtures, both for the DUT and reference fibers; c) an initial minimum gap d between the DUT and reference fiber mounting fixtures, based on limitations of stage travel and/or contact limits when the mounting fixtures meet; and d) typical variations in initial gap distance based on previous runs. Later measurement steps rely on gap distance estimates generated in the immediately previous measurement step.

Relationship Between Gap Distance d and Stage Position

In an example of the methods disclosed herein, measurement steps are generally conducted over ranges of target ferrule gap distances d. For example, IL measurements may be made as the gap distance d is varied over a range from 700 μm to 200 μm. Once an estimated gap distance $d_a$ has been established for a given measurement step, the absolute stage position $z_a$ (of stage 80) associated with this gap distance can be recorded. The stage position $z_b$ associated with any other target gap distance $d_b$ can be calculated via $z_b = z_a + (d - d_b)$, where stage position increases as the gap distance is reduced.

Measurements of IL during early measurement steps can provide feedback on connector and/or cable performance. For example, an error can be flagged if the measured IL curve lacks key features, such as:

1) No light observed: Possible jumper cable fiber break or extreme fiber ferrule end face contamination.
2) Extremely high IL: Possible end face contamination or high jumper fiber loss.
3) Constant IL value due to the ferrule not sliding properly in the alignment member.
4) Sudden changes IL value or slope due to ferrule gripping and slipping within the alignment member.
5) Sudden changes IL interference fringe amplitude or period due to ferrule gripping and slipping within the alignment member.

Depending on the severity of the detected IL error, an operator may be prompted to re-clean a connector or to reject a failed jumper cable.

Some of the error conditions described above can be traced to insufficient or excessive force applied on connector ferrules 90 by the passive alignment surface. For example, a ceramic alignment member 200 may grip a connector ferrule 90 tightly so that the connector ferrule does not slide freely within interior 204. When the ferrule does finally move, it may slide rapidly, leading to a lack of correlation between changes in gap distance d and stage position $P_S$.

System 10 can be used to detect problem conditions via IL measurement data and then make dynamic changes to measurement conditions in an attempt to improve IL measurement quality. For example, the ferrule velocity within the member can be modified, the squeezing force can be increased or decreased, and the connector ferrule lateral or angular offset may be adjusted, assuming automatic control of these axes is provided.

Stage Position Prediction

An aspect of the disclosure includes predicting the position $P_C$ of stage 80 at which the respective end faces 92R and 92D of the reference and DUT connectors 70R and 20D will make contact. This position is called the contact position. There are a number of different methods available that have different degrees of gap distance estimation uncertainty, so they are suitable for use in various measurement steps.

Figure 4:
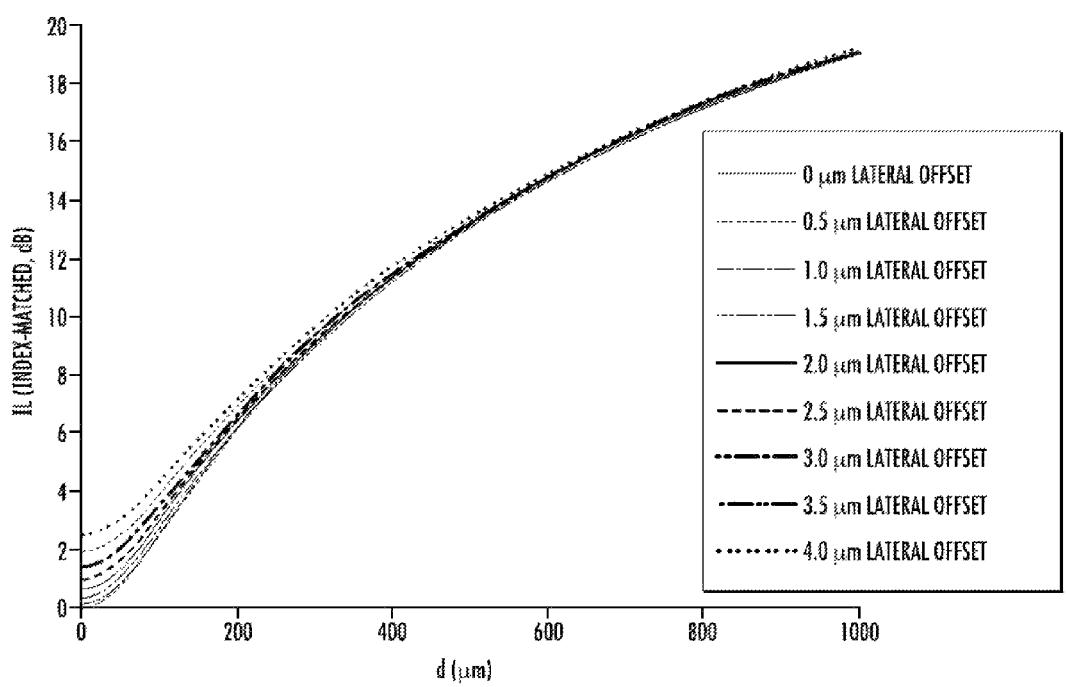
FIG. 4 is a plot of the insertion loss IL (index-matched, in units of dB) versus gap distance d (μm) for lateral offsets ranging from 0 μm to 4 μm in 0.5 μm increments and for λ=1550 nm, as determined based on the analysis as set forth in Appendix A.

1. Estimation of Contact Position $P_C$ at Large Axial Separations Using IL Curve Simulation of the measurement of IL vs. the axial separation for two fibers operably supported in respective ferrules results in a well-defined curve that monotonically decreases as axial separation is reduced. Such a plot of IL (dB) versus gap distance d (μm) is shown in FIG. 4 for 5 different lateral offsets ranging from 0 μm to 4.0 μm in 0.5 μm increments, for λ=1550 nm. The simulations are based on the analysis provide in Appendix A, below.

The shape of the curve does not change dramatically with typical mated ferrule fiber core lateral misalignments (e.g., 0.5 μm to 1.0 μm) at large axial separations (e.g., d>100 μm). While the shape of the curve is dependent on fiber-to-fiber angular misalignment, the proposed member-based passive alignment approach ensures that ferrule angular misalignments are small. Therefore the IL curve can provide a rapid first estimate of gap distance d at large ferrule separations (e.g., d>2000 μm) commonly encountered in early measurement steps.

In the example gap estimation approach, an IL measurement is made soon after the DUT connector ferrule 90D is fully inserted into alignment member 200. Since a large axial separation d exists between ferrule end faces 90R and 90D at this point, the resulting IL measurement is substantially insensitive to lateral misalignments. Therefore the measured IL value may be used to estimate the gap distance d by performing a simple look-up function on a previously measured or modeled IL curve. For example, with reference to the plot of FIG. 4, if an IL of 19 dB is measured, an initial estimate for gap distance d would be approximately 1000 μm.

In practice the gap G between reference and DUT connector ferrules 90R and 90D (or more precisely the reference and DUT fiber end faces 65R and 65D) creates a Fabre-Pérot etalon that produces constructive and destructive interference fringes from light 22 as the DUT and reference ferrules are moved closer to each other. The amplitude of the interference fringes can be several tenths of a dB, resulting in a significant uncertainty in the actual gap distance d. For example, at a separation distance of 2000 μm, the interference fringe amplitude can be 0.3 dB. This 0.3 dB variation in measured IL corresponds to a 100 μm variation in gap distance d. Fortunately, the expected uncertainty in this estimate of the gap distance d estimate (100 μm) is much less than the gap distance value (2000 μm), so this simple approach is useful for providing gap distance estimates for early measurement steps.

If needed, the axial position associated with the insertion of ferrule 90D of DUT connector 70D into the alignment member 200 can also be determined using IL measurements. FIG. 5 is a plot of the measured insertion loss $IL_M$ (dB) versus gap distance d (μm) that shows how $IL_M$ changes as ferrule 90D of DUT connector 70D is inserted into alignment member 200 and towards reference connector ferrule 90R. Prior to this occurrence, the DUT ferrule 90 is likely positioned with some lateral misalignment relative to the optical axis of light launched from the reference connector fiber 64R. The stage velocity during insertion was initially high (1 mm/sec), so only a few data points are recorded as the gap distance D was reduced from 5000 μm to 4000 μm, and the low coupled power levels reveal detector noise that distorts the measured signals.

In an example, during the insertion of DUT ferrule 90D of DUT connector 70D into alignment member 200, the angled tip of the DUT ferrule contacts the end of the alignment member and the DUT ferrule is brought into lateral alignment with the alignment member. This alignment process results in a gradual lateral shift in the DUT fiber position that causes the IL to gradually be reduced. Once the DUT ferrule 90D has been inserted into the alignment member 200 so that the DUT ferrule sidewalls begin to slide along the interior surface of the alignment member 200, the rate of IL reduction is reduced. The sudden change in the rate of IL reduction can thus be used to identify the axial stage position at which the ferrule 90D is inserted into alignment member 200. This information can be used with other connector and measurement bench geometrical data to provide a coarse estimate for the stage position $P_C$ where contact between respective end faces 92R and 92D of ferrules 90R and 90D of the reference and DUT connectors 70R and 70D will occur.

2. Contact Position Estimation Via Extrapolation Method

Multiple measurements of the IL may be obtained over a range of gap distances d to improve the accuracy of the gap distance estimate. In an example, an extrapolation technique is used that converts measured IL data into an estimate of the contact position $P_C$ of stage 80. The accuracy of the extrapolation approach depends on the range of gap distances d over which IL data are obtained and the magnitude of the gap distance.

In an example, the extrapolation involves three calculation steps: 1) filter out interference fringes in IL data; 2) map data to a function that varies linearly with gap distance; and 3) perform extrapolation over a linear function to find new contact position estimate. These three steps are now described in more detail.

As described below, partial reflections of light off the air/glass interfaces present in the etalon formed between the ferrule end faces 92R and 92D causes constructive and destructive interference effects as the gap distance d is changed during ferrule motion within alignment member 200. At gap distances d that are even multiples of λ/4 away from ferrule contact, constructive interference effects cause the transmitted and doubly reflected optical transmission paths to add in phase. For small gap distances d, the coupling IL is almost equal to the IL for the non-back-reflection case. When the gap distances d are large, the back reflected light diffracts sufficiently as it propagates between the facet end faces so that only a fraction of the reflected light couples into the receiving fiber.

At gap distances d that are odd multiples of λ/4 away from ferrule contact, destructive interference effects cause the transmitted and doubly reflected optical transmission paths to add 180° out of phase. This causes the coupled power to drop by a factor of twice the back-reflected power fraction, or about 8% or 0.6 dB.

Since the measured IL varies substantially as the gap distance d is reduced by small amounts (e.g., λ/4=0.388 μm), the interference fringes appear as a periodic noise signal with an amplitude more than 10 times larger than the target measurement accuracy. Using a filter function, fringes may be removed from the measured IL data, improving the accuracy of subsequent ferrule contact position estimates.

FIG. 6 is a plot of the IL (dB) versus the stage position (μm) that shows how the measured IL date includes interference fringes, and how the fringes can be eliminated by applying a filter that only reports MIN {IL}, i.e., the minimum IL value for each fringe cycle, as illustrated by the triangles. In an example, the IL measurement sampling period should be about 15 times smaller than the fringe period to accurately resolve the fringe minima IL values and stage positions.

For a stage velocity v, the fringe period will be λ/2 v seconds, so the IL measurement sampling period should be at least λ/30 v seconds, which corresponds to a sampling rate 30 v/λ or higher. As an example, for a maximum IL measurement sampling rate of 2 KHz and λ=1.55 μm the maximum stage velocity for full fringe resolution is 2000λ/30 μm/second or about 100 μm/second. If measurements are made at significantly higher velocities the IL data will suffer from aliasing errors due to undersampling of the IL signal.

Figure 7:
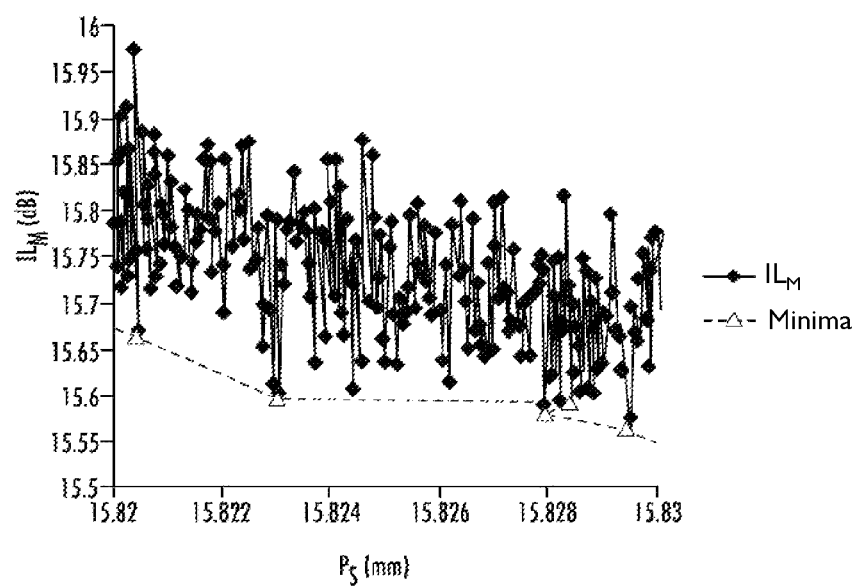
FIG. 7 is similar to the plot of FIG. 6 and shows a variation in the $IL_M$ minima due to measurement noise.

The minima filter may be implemented in a variety of ways. For example, minima points may be identified by determining the set of unique IL measurement/stage position coordinate pairs that satisfy IL(z)<MIN {IL(z)} evaluated over the interval [z, z+λ/2]. If the IL measurement data contains a high frequency noise component this minima filter will be biased toward lower IL values by noise outlier points that fall below the constructive interference IL minima, as shown in the plot IL vs. stage position (mm) of FIG. 7.

Measurement noise can also cause the majority of fringe minima points to not be detected by the minima filter. For example, when the ferrule end faces 92R and 92D are nearly in contact, the slope of the IL curve is generally low so only a few minima may be detected over large variations in gap distance. The reduced number of $IL_M(z)$ measurement points tends to reduces the accuracy of the contact extrapolation routine.

Figure 8:
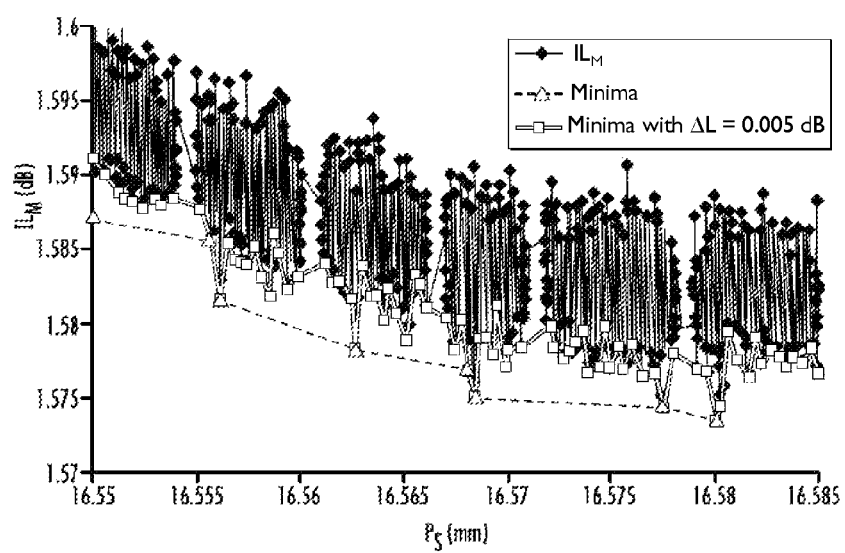
FIG. 8 is similar to FIG. 7 and shows an increase in the number of minima by increasing $\Delta IL$ from 0 dB to 0.005 dB.

To address these noise-related problems, additional near-minimum IL data points can be collected by identifying the set of unique points where IL(z)<MIN {IL(z)}+ΔIL evaluated over the interval [z, z+λ/2]. The value for ΔIL can be selected to be significantly less than the peak-to-peak amplitude of the interference fringes, so that only IL data points near the bottom of the interference fringes are collected. For example, a ΔIL value of 0.005 dB will collect several IL measurement points near the minima of the fringe, improving measurement accuracy over approaches that only provide a single data point per fringe minima, as shown in the plot of IL (dB) vs. stage position (mm) of FIG. 8. Thus, the number of ILM(z) minima points is increased by increasing ΔIL.

Other functions or algorithms may also be used to generate IL minima points. For example the function cummin( ) in R and GNU Octave may be used to generate a set of minima points that contains duplicate values (which can then be removed using the as.numeric(names(table( ))) functions on a set of measurement points IL(z)).

In another approach, measured IL data may be filtered using the Visual Basic pseudo-code shown in FIG. 9. The routine first identifies the most recent IL value that is less than all previously identified values (plus a ΔIL offset if desired to provide additional minima points to help offset minima noise spikes). The routine then reports as true minima points only the minimum IL value that is at least ½ an interference fringe old. This approach ensures that only a single IL fringe minima point is returned per fringe cycle, and that the returned minima point is the lowest IL measured point. The pseudo-code of FIG. 9 defines a set of instructions that can be embodied in a computer-readable medium that cause computer (controller) 180 to identify the minima of the IL data.

The IL data may be filtered in other ways to eliminate the presence of interference fringes, for example: a) Low-pass filter or signal averaging, possibly with a constant office term added so that IL values better match the constructive interference IL curve; b) low-order Gaussian quadrature or other polynomial/spline fit to data segment; and c) simple minimum filter, yielding all measured IL(z) points where IL(z)=min(IL(z)) over the interval [z, +∞]. These approaches will all remove high frequency interference fringes from the measured IL data, resulting in a smoother curve that more accurately represents the expected IL response in the absence of Fabry-Pérot etalon cavity interference effects.

Figure 10:
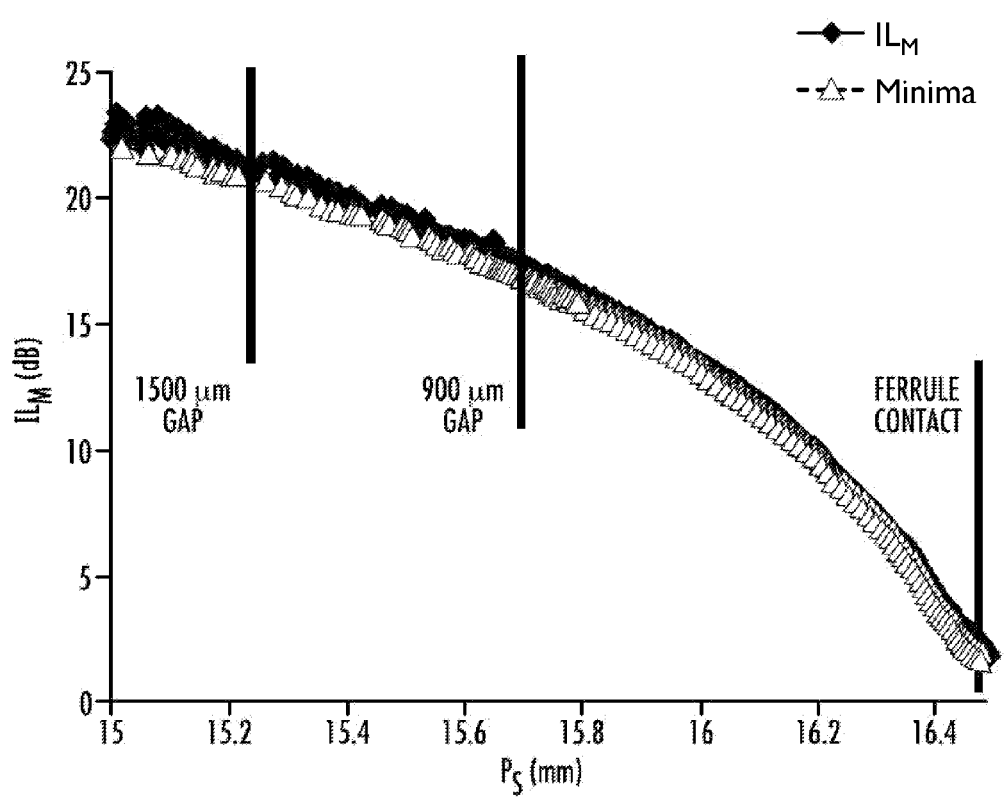
FIG. 10 is a plot of $IL_M$ (dB) versus the stage position $P_S$ (mm) that shows $IL_M$ and the $IL_M$ minima as the connector ferrule is moved within the alignment member, and that also shows different stage velocity regions that depend on the size of the gap (i.e., the value of d)

FIG. 10 is a plot of measured insertion loss $IL_M$ (dB) and the $IL_M$ minima against stage position $P_S$ (mm). The stage position $P_S$ represents the distance from a stage origin set in a previous stage homing operation. At a stage position $P_S$=15 mm, the gap distance d is approximately 1.5 mm, while ferrule contact will occur at a stage position $P_S$ of around 16.5 mm. Measurements are taken at two different stage velocities v to minimize total measurement cycle time: v=1 mm/sec for gap distances d>900 μm and v=100 μm/sec for gap distances d<900 μm. At the faster v=1 mm/sec velocity, the plot of FIG. 10 shows that system 10 is unable to accurately resolve all interference fringes, as the 2000 KHz sampling rate used in this example limits the maximum stage velocity for accurate fringe resolution to v100 μm/sec. This undersampling introduces noise on the $IL_M$ and $IL_M$ minima curves as data points are sometimes shifted to slightly higher IL values in this region. However, the general shape of the $IL_M$ curve can still be clearly resolved in this region. Measured data appears smoother in the lower velocity region where the stage position is closer to establishing contact between the reference and DUT ferrule end faces 92R and 92D.

It should also be noted that these filtering techniques can also be applied to the IL data after the mapping to a linear function STX(z), as described below.

The interference fringe filtering processes described herein are only required when the measured IL curve exhibits fringes. Some mated connector configurations may not need fringe filtering for all gap distances. For example, an APC (Angle Polished Connector) ferrule has an end face that limits the amount of light that is back-reflected across the gap between ferrule end face. Also, multimode optical fibers carry light in many modes that propagate at slightly different velocities. For large gap distances, each mode has its constructive and destructive interference peaks at different positions, which causes fringe contributions to average out so that the resulting IL curve appears fringe-free.

To predict the ferrule contact location $P_C$, the measured IL data is mapped into a dimensionless function STX(z) that varies linearly with gap distance. The function is defined by STX(z)=10 exp {$IL_M(z)$/20}, where $IL_M(z)$ defines the set of fringe minima points derived using one of the techniques described above. The derivation of the STX(z) function is provided in Appendix A below. It provides a linear function for large gap distances that becomes slightly less linear as smaller gap distances are approached. It also becomes sensitive to lateral misalignments at small gap distances, so it is not recommended for use when the gap distance is less than about d=30 μm. Insertion loss shifts due to high jumper cable fiber losses can introduce additional shifts to STX(z) that can be compensated for if the estimated fiber IL is known.

Figure 11:
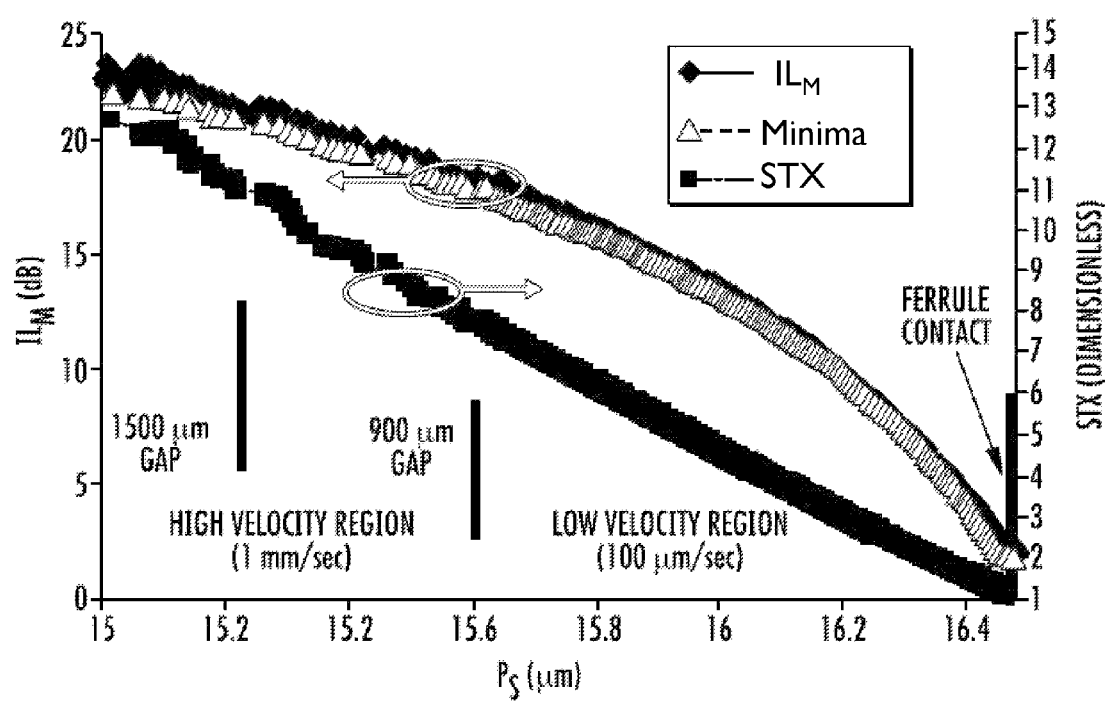
FIG. 11 is similar to FIG. 10 and shows the linear function STX(z)

FIG. 11 shows how STX(z) varies linearly with stage position $P_S$ (i.e., z position), approaching a value near 1.0 at ferrule contact. At a stage position of 15 mm, the gap distance d is approximately 1.5 mm, while ferrule contact will occur at a stage position $P_S$=$P_C$ of around 16.5 mm. Since the Measured IL and ILM data are noisy over the high velocity region where the gap distances exceeds 900 μm, the calculated STX(z) is also noisy in this region. The linear response of the STX(z) curve over most of the low velocity region closer to ferrule contact can be used to estimate the ferrule contact position $P_C$. Very close to ferrule contact (e.g., about 30 μm away), the STX(z) curve exhibits a slight non-linearity that varies with fiber-to-fiber lateral misalignment. Therefore linear fitting using the STX(z) curve is avoided in this region.

Figure 12:
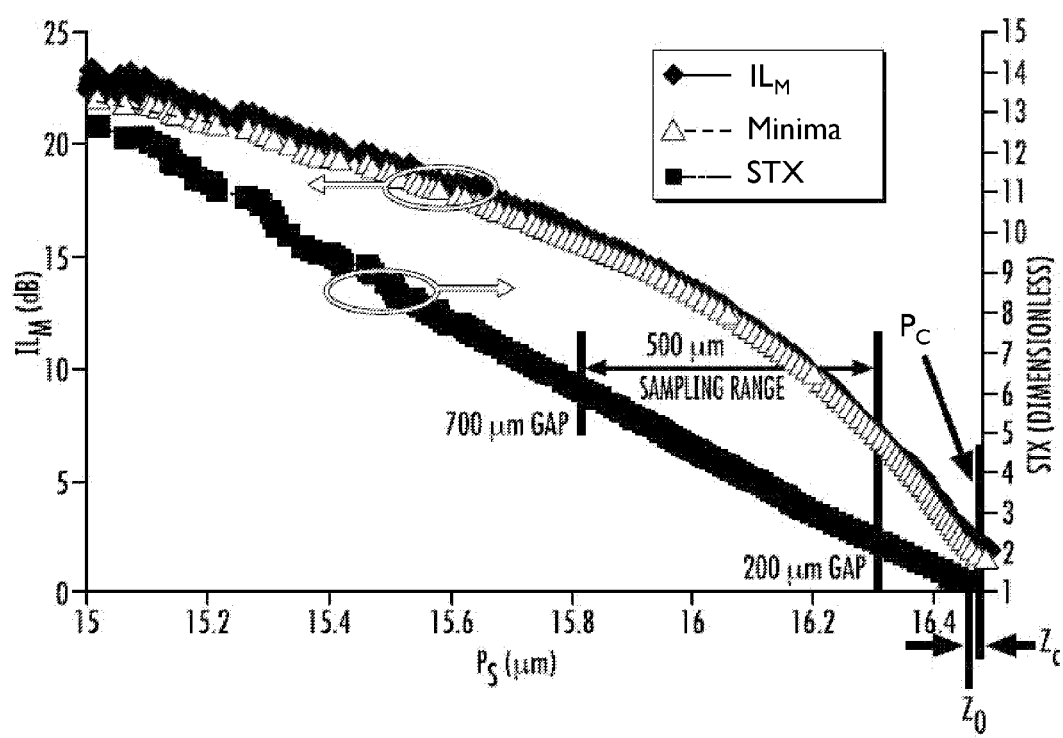
FIG. 12 is similar to FIG. 11 and shows the linear extrapolation of STX(z) over the sampling range to determine an intercept position $z_0$.

An estimate of the ferrule contact position $P_C$ is made by performing a linear regression over STX(z) data that fall within a sampling range and calculating where the STZ(z) line intercepts it's contact value of 1.0. FIG. 12 is similar to FIG. 11 and shows an example sampling range that spans stage positions $P_S$ between 200 μm and 700 μm away from ferrule contact. Execution of a linear fit over this range yields values for m and c in a linear function y=mz+c, where m is the slope of the curve and c is the y-axis intercept.

FIG. 12 illustrates the linear extrapolation of STX(z) over sampling range to determine an intercept position $z_0$. Once the coefficients m and c are determined, the intercept position $z_0$ where STX=1.0 can be calculated by setting $1.0=m \cdot z_0+c$, where $z_0=(1-c)/m$. Because STX becomes slightly non-linear near the ferrule contact position, and because it can be shifted by slight changes in IL of the fiber link itself, the intercept location $z_0$ is shifted by additional z-offset $z_c$ to predict the contact location more accurately, wherein $z_{contact}=z_0+z_c$. The value for $z_c$ can be determined experimentally for a given sampling range by measuring IL until the ferrules make contact, and then noting the stage position where contact occurs.

In general, the run-to-run variation in $z_c$ is much smaller than the required accuracy for predicting the contact position $P_C$. As stated above, the STX(z) extrapolation method may be applied multiple times over the course of a measurement, where early stage extrapolations provide a coarse estimate of contact position, while late stage extrapolations provide a fine estimate of the contact position.

For an STX linear regression sampling range of 200 μm to 700 μm, repeat measurements on the same pair of DUT and reference connector ferrules yielded an average $z_c$ of 55.4 μm. The error between measured contact position $P_C$ and the contact position predicted via extrapolation of STX(z) had a standard deviation σ=5.0 μm. For an STX linear regression sampling range of 70 μm to 30 μm, repeat measurements on the same pair of DUT and reference connector ferrules yielded an average $z_c$ of 2.4 μm. The error between measured contact position and the contact position predicted via extrapolation of STX(z) had a standard deviation σ=1.0 μm. In both cases the variation in the contact position estimate is small enough to meet the contact position uncertainly requirements of downstream measurement steps.

Examples of the measurement methods described herein require sub-micrometer correlation between the motion of stage 80 and ferrule end face 92 within alignment member 200. Even though the ferrules 90 are mounted on resilient members 100 within the connector housings 72, experiments show that sub-micrometer changes in the stage position translate to matching sub-micrometer changes in the ferrule position. This result has been identified based on observation of interference fringes.

Experiments show that some combinations of DUT ferrule 90D and alignment member 200 can occasionally result in small differences in the way the ferrule slides within the alignment member. Thus, even though the stage velocity is constant, the ferrule 90 exhibits a slight variation in its velocity within alignment member 200.

Figure 13:
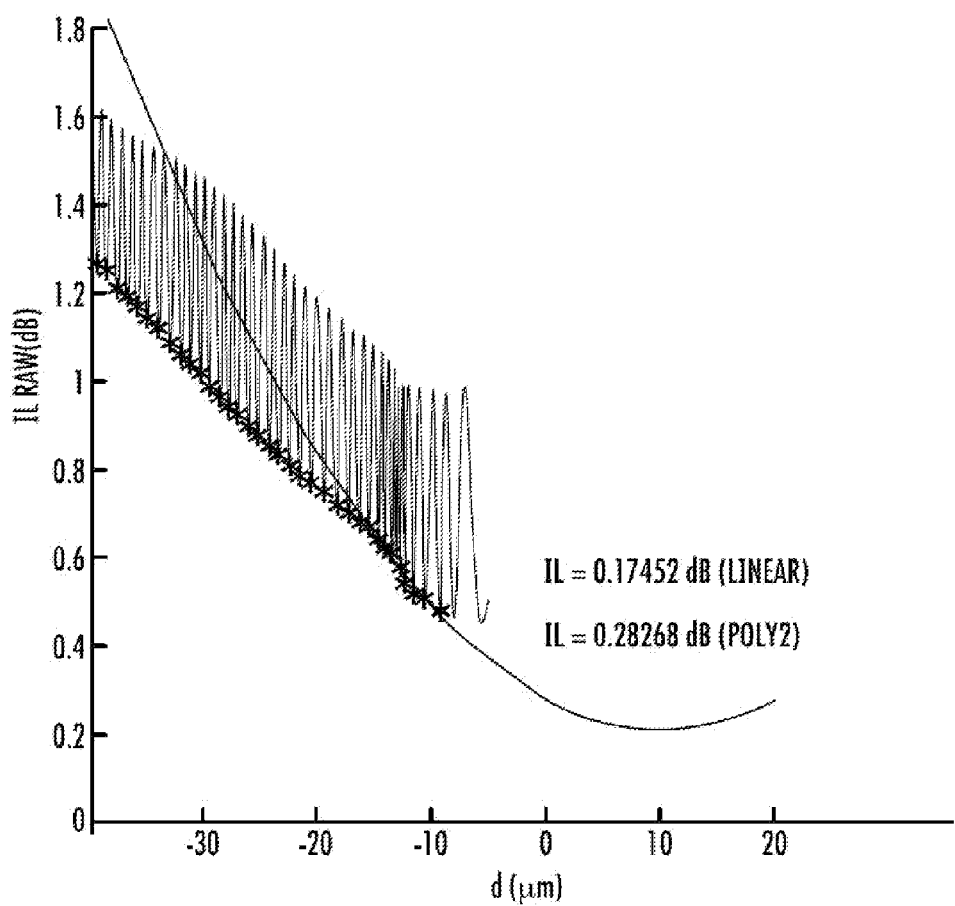
FIG. 13 is a plot of the raw IL (dB) versus the gap distance d (μm) and shows the variation in the fringe pitch that indicates grip and slip between the connector ferrule and the alignment member, and also shows two values of IL based respectively on linear extrapolation and polynomial extrapolation.

FIG. 13 is a plot of the raw IL (dB) versus the gap distance d (μm), wherein distortion of the IL curve appears to be due to small variations in the ferrule velocity during the measurements. This conclusion is reached based on observation of correlated variations in the pitch of the IL curve interference fringes. Problems in stage motion can also be detected by observing local variations in the amplitude of the interference fringes, which may be linked to sudden lateral or (less likely) angular misalignments of the ferrule within the member.

The configuration of system 10 lends itself to accurate measurement of the gap distance d via interferometric methods. Aspects of the disclosure include two interferometric methods for the determining gap distance d, with one method based on single-wavelength measurements and another based on dual-wavelength measurements. The methods relax the requirement that the stage motion and ferrule motion be highly correlated, thereby providing tolerance from grip and slip events that may arise due to mismatched ferrule and member geometries or squeeze forces.

Interferometric determination of ferrule motion in alignment member 200 also enables low-velocity motion of the ferrule 90 within the alignment member, below the 3 μm/sec limit required for smooth sliding motion of the ferrule. The approach also provides ferrule position information during motion reversals required for repeat measurements, where the compression or relaxation of resilient member 100 normally introduces hysteresis between the stage position and the ferrule position.

While interference-based approaches for position measurement are attractive, they require the presence of interference fringes, which may be diminished or not-existent over certain gap distances for APC and MM fiber connector measurements.

In the single-wavelength interference fringe measurement method, stage position is determined by observing when maxima and minima appear in measured IL data. Alternatively, the phase of the interference pattern may be determined so that, using information on the current stage motion direction, the rate of change of ferrule-to-ferrule gap distance d may be determined. While the interference method provides information on the relative position of the reference and DUT ferrules 90R and 90D, the motion changes relative to an arbitrarily determined home position can be measured accurately.

A coarse estimate of ferrule gap distance d may also be made by observing the amplitude of the interference fringes. At large gap distances, the amplitude of the interference fringes will be low, while at small gap distances the interference fringe amplitude will be high. This is particularly true in the case of APC and MM connector measurements, where fringes appear 20 μm to 30 μm away from contact and increase in amplitude rapidly approaching contact.

Grip and slip events can involve sudden increases in ferrule velocity as the ferrule breaks free and slides within the alignment member. It is important that interference-based measurement systems acquire IL data at a sufficiently high sampling rate to accurately resolve fringes even during slip events. Single-wavelength interference fringe measurements can be used as the sole source for determination of ferrule gap distance within the alignment member, or it may be used to augment traditional motion stage encoder position feedback by detecting when grip and slip events occurs (via an observed changes in fringe pitch or amplitude). Using this feedback, the measurement system can make adjustments to stage velocity or alignment member squeeze pressure so that grip and slip events are reduced or eliminated.

Figure 14:
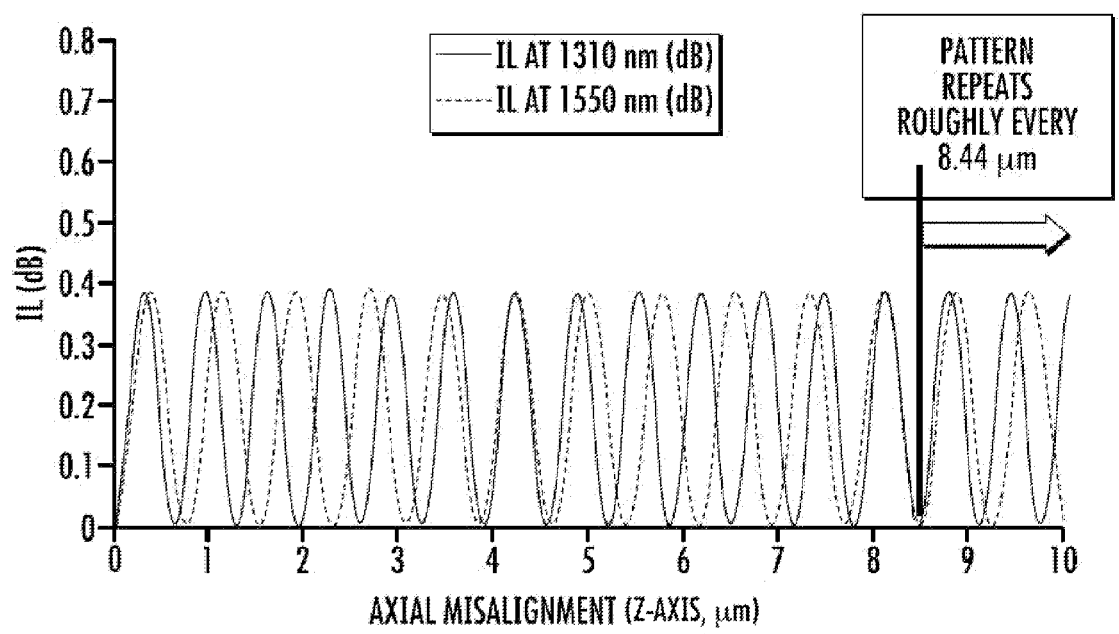
FIG. 14 is a plot of the IL (dB) versus axial misalignment (z-axis, in μm) and that shows interference fringes using two wavelengths for an absolute determination of the gap distance d within the beat cycle region.

When the gap G between the ferrule end faces is interrogated by light at two different wavelengths $\lambda_1$ and $\lambda_2$, the interference fringes will appear at two different spatial periods $P_1=\lambda_1/2$ and $P_2=\lambda_2/2$, respectively as the gap distance d is changed. At ferrule contact (d=0), both interference fringes correspond to a constructive interference condition where IL is minimal. As the gap distance d is increased, both interference fringes cycle with different periods corresponding to their wavelength. This is illustrated in FIG. 14 and the plot therein of IL (dB) vs. gap distance d (µm). Assuming $P_1 > P_2$, at some distance $P_{beat}$ the interference fringe associated with $\lambda_1$ will accumulate n cycles, while the interference fringe associated with $\lambda_2$ will accumulate approximately n+1 cycles. At this point, the interference fringes for both wavelengths $\lambda_1$ and $\lambda_2$ will again be in or nearly in their constructive interference conditions. Over the region between these two constructive interference conditions (from gap distance s=0 to gap distance $d=P_{beat}$) the two wavelengths $\lambda_1$ and $\lambda_2$ transition from being completely in phase to 180 degrees out of phase to back (or nearly back) in phase.

The variation interference fringes for the two wavelengths over the gap distance d=0 to $P_{beat}$ can be used to infer the exact gap distance d within this range. For example, the phases of the two interference fringes may be monitored, with unique gap distances correlated to unique phase combinations for the two wavelengths.

The measurement system can interrogate the ferrule gap G with two wavelengths either continuously or discretely time. In the continuous interrogation case, light 22 from two continuously operating wavelength sources 20 is coupled into a single optical fiber and directed simultaneously through the DUT and reference connector gap G. Light captured in the reference fiber 62R is wavelength demultiplexed into two detectors so that interference fringe changes may be monitored continuously. In an alternative configuration, narrowband wavelength filtering may be implemented at each detector, either optically or via detector electronics, so that each detector only monitors power levels for one wavelength.

In the discrete time measurement system, only one wavelength is directed through the DUT and reference connector gap at a time. The single-wavelength light source 20 may be a tunable laser, or alternatively an optical switch that selects light from one of two single wavelength sources. Light from the reference connector 70R is directed onto a single broadband detector that is sensitive to light from both source wavelengths. The tunable laser or switch must change source wavelengths at a rate much higher than the expected rate of change of interference fringe amplitude at the maximum stage velocity.

The width of the beat cycle region is given by $P_{beat} = n \cdot \lambda_1$, where n is calculated by assuming that at the end of one beat cycle $nP_1 \approx (n-1) \cdot P_2$, then solving for n, yielding $n = P_2/(P_1 - P_2)$. Values for $\lambda_1$ and $\lambda_2$ are selected so that n that is as close to an integer as possible for a full constructive interference to constructive interference cycle, or as close to a half-integer as possible for a constructive interference to destructive interference cycle. The difference between $\lambda_1$ and $\lambda_2$ determines the width of the beat cycle region, with small wavelength differences corresponding to large beat cycle region widths. As an example, for $\lambda_1 = 1.55$ µm and $\lambda_2 = 1.3$ µm, $n \approx 5.45$ and $P_{beat} = 8.44$ µm.

In one measurement approach, the STX(z) linear extrapolation method may be used for coarse estimation of the contact position $P_C$, while more precise methods, such as the dual-wavelength interference approach, may be used once the coarse estimate falls with the beat cycle region closest to ferrule contact. In this case, large beat cycle region widths are desirable because they increase the likelihood that an initial coarse estimate will fall within the beat cycle region. If the beat cycle region is excessively wide, very coarse initial estimates may be used for ferrule contact prediction, possibly reducing total measurement cycle time.

The optimal width of the beat cycle region depends on the ability of the measurement system to resolve small changes in the relative phase of the two interference patterns. If $P_{beat}$ is large (corresponding to large n), the interference fringes for the two wavelengths will change in almost the same way as the gap distance d is increased or decreased. Uncertainty in interference fringe phase corresponds to uncertainty in gap distance d. Use of more narrow beat cycle regions trade off higher accuracy in interference fringe phase with a more narrow ranges over which the gap distance is known absolutely within the bounds of the beat cycle region.

In another measurement approach the gap distance may be reduced within a beat cycle region while the IL is measured. Near the end of the beat cycle region the rate of change of the IL measurement may be assessed along with previous IL measurements and/or curve fits to determine if the IL slope is shallow enough to correspond to a near-ferrule contact condition. If this is the case, the measurement terminates a known distance away from ferrule contact, ensuring that ferrule contact is never made. If the measurement algorithm determines that the IL measurements are inconsistent with measurements made within the beat cycle region adjacent to ferrule contact, then stage 80 can be directed to reduce the gap distance d by one or more multiples of $P_{beat}$ to make progress towards the target near-contact gap distance (e.g., d=5 µm).

Once the gap distance d is reduced below a select minimum value (e.g., d=300 µm), the slope of the IL curve becomes more and more flat approaching the contact position. The slope of the IL curve can be used as a trigger to identify when the ferrule gap distance d has been reduced below some target (select) value. Since the rate of change of the slope is reduced very close to contact, other near-contact prediction methods, such as polynomial curve fits to IL curve data or dual-wavelength interference fringe detection, will yield more accurate results very close to contact. The IL slope can also be used as a verification check on other near methods described above for estimating the contact position $P_C$.

In an example where alignment member 200 translucent or transparent, light 22 can be directed into gap G between to estimate the near-contact condition. The amount of light 22 that passes through the gap G over the gap distance d can be monitored in different ways. One way uses a vision system VS (see FIG. 3A) to observe the ferrule end faces 92R and 92D through alignment member 200 as they approach. Another method involves launching light through the gap G between the ferrules and detecting amount of light captured at a nearby photodetector. The physical locations of the reference and DUT ferrules 90R and 90D can also be measured by scanning a laser profilometer beam over the gap between the ferrule end faces 92R and 92D. The variation in surface profiles, and in particular the relatively location of the connector ferrule ends, can be measured as the ferrules approach the target near-contact condition.

Near-contact between reference and DUT ferrule end faces 92R and 92D can also be established using mechanical insert 220 that fix ferrule end face spacing d, as shown in the close-up cross-sectional view of FIGS. 15A and 15B. In the example shown in FIG. 15A, mechanical insert 220 has an aperture 222 in the optical path between bare fibers 64R and 64D. In the example shown in FIG. 15B, mechanical insert 220 is in the form of a shim inserted through an aperture 205 in alignment member 200. In another example, a probe can be used to detect mechanical interference of the reference and DUT ferrule end faces 92R and 92D.

These approaches may be applied independently, or in conjunction with other near contact measurement methods. For example, mechanical shim 220 can be used to rapidly set the ferrule gap distance d to a known amount. Then an optical interrogation method, such as dual-wavelength fringe measurement, can be used to provide fine feedback on ferrule gap distance d. If the dual-wavelength beat cycle region width is wider than the thickness of the mechanical shim 220, an exact estimate of the ferrule gap distance d can be made immediately after the shim is removed from gap G. The stage 80 can then be moved to reduce the ferrule gap distance d to the target value.

After a measurement step has generated a sufficiently accurate estimate of the contact position $P_C$, the ferrule gap distance d is reduced via motion of the reference ferrule 90R via stage 80. As mentioned above, multiple estimates of ferrule contact position $P_C$ can be made, with early stage measurements providing a coarse estimate of contact position and late stage measurements providing a fine estimate of contact position. During this portion of the measurement, the motion of stage 80 can be carried out in discrete steps, or can be made substantially continuously, with the contact position estimate from one step being passed to the next step without any change in the stage motion (beyond a possible change in stage velocity).

Instead of implementing discrete steps for measuring IL and then estimating the contact position $P_C$, measurement data may be continuously fed into an STX(z) linear extrapolation routine that continuously updates an output estimate of contact position. An independent motion control loop can use this continuously, changing the estimate of the contact position to drive stage motion as quickly as possible to this position. The control loop can continuously or discretely increase or decrease the stage velocity v during the approach to the contact position $P_C$, and it can automatically decelerate as it nears the contact position to avoid an overshoot condition that could lead to inadvertent ferrule-to-ferrule contact.

Once the ferrule gap distance d is very close to contact (e.g., d is in the range from 5 μm to 20 μm), measurements are conducted to estimate the IL of DUT connector 70D. In the simplest approach, the ferrule gap distance d is reduced to the minimum separation distance (e.g., 5 μm) and an IL measurement is made. This measured $IL_M(z)$ value can be reported as the DUT IL (since the gap distance is so small), or a constant offset value can be subtracted from the measured $IL_M(z)$ value to take the non-zero slope of the IL curve into account at the 5 μm gap distance d. Since this measurement approach relies on a single measured value, any measurement error will contribute directly to error in the reported DUT IL.

Measurement error can be reduced by using multiple IL measurements near the minimum gap distance d. For example, IL measurements can be made over a range of gap distances d near the contact position $P_C$, such as over the range 20 μm to 5 μm, as shown in FIG. 16 and the plot therein of the measured insertion loss ILM (dB) for the DUT connector 70D as a function of gap distance d (μm). A polynomial curve can be fitted through the set of ILM(z) minima points as shown, where the polynomial order is:
1) 0: ILM(z) minima point averaging
2) 1: Linear fit to minima data
3) 2: Parabolic fit to minima data
4) 3: Cubic curve fit to minima data
5) 4: Fourth-order curve fit to minima data In general there are at least three ways that the DUT IL can be estimated:
1) Estimate DUT IL as the (local) minimum of fitted polynomial (appropriate for orders of 2 or more).
2) Estimate DUT IL as the value of the fitted polynomial at the point where the estimated gap distance d is zero. This is the only approach suitable for linear curve fits.
3) Estimate DUT IL using a constrained polynomial fit, where the (local) minimum of the fitted curve is constrained to occur where the estimated gap distance d is zero (appropriate for orders of 2 or more). For example, for a parabolic curve fit, the fitting function would be of the form $y=az^2+c$ instead of $y=a(z-z_0)^2+c$.

Experiments show that the linear fit often underestimates the DUT IL while the parabolic fit overestimates the DUT IL. Another estimation approach is to report a weighted average of DUT IL estimates obtained via different polynomial curve fit methods.

While the measurement system targets measurement of individual jumper cable connectors, the connector IL measurement approach described here requires passing light through the entire length of the DUT jumper cable. Therefore the measurement system always measures the total jumper cable IL, which is a combination of:
1) Jumper cable fiber link IL, including bend losses, splice losses (if any) or other fiber defects (e.g., broken fibers)
2) DUT connector IL measured within the ceramic member
3) Non-DUT connector IL measured on the opposite end of the jumper cable, which is assumed to be zero since its output is directed into a broad area detector or integrating sphere.

During the DUT connector IL measurements, the connector ferrule 90R (or 90D, or both 90R and 90D) is moved through a range ferrule gap distances d, from very large to very small. The IL measurements made at various ferrule gap distances d can provide additional information to differentiate jumper cable fiber link IL from DUT connector IL. In particular, at positions far from contact a constant shift in IL toward higher loss can be attributed to fiber link IL. The IL curve has a specific shape that arises from the way light couples between optical fiber cores as the ferrule end face gap is changed. The way this curve changes shape with ferrule end face gap is independent of any constant IL associated with fiber link loss.

Additionally, the shape of the IL curve is approximately the same at large ferrule gap distances for moderate fiber core lateral misalignments commonly found in mated optical connectors. Therefore fiber link IL will appear as a constant IL that shifts the signature IL curve to higher loss values. Since the IL curve is measured at many ferrule gap distances, many IL measurements are available to make an accurate estimation of fiber link IL.

Figure 17:
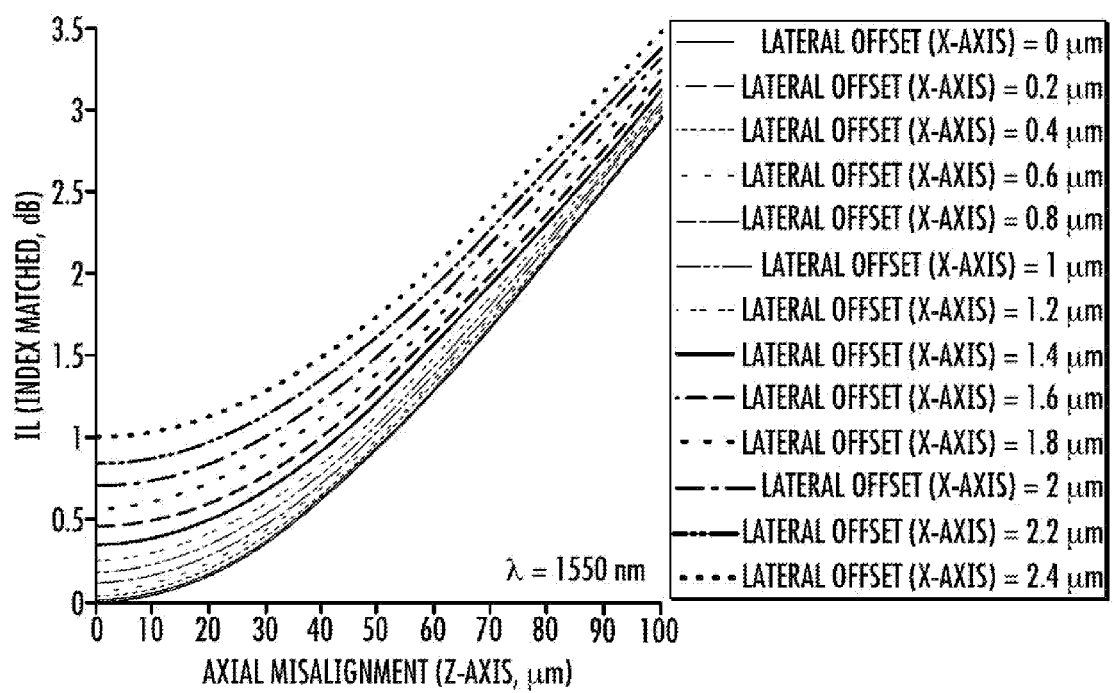
FIG. 17 is similar to FIG. 14 and shows the simulated insertion loss IL (dB) versus the axial misalignment (μm) under various lateral misalignment conditions, showing how the IL curves near the contact position exhibit slightly different curve shapes.

Also, at positions near ferrule contact, the curvature of the IL curve can be linked to connector-based fiber lateral offset. As shown in the plot of FIG. 17 of the insertion loss IL (index-matched, dB) vs. gap distance d (μm), different lateral misalignment conditions generate IL curves with different curvatures near contact. By matching the shape of the measured IL curve with these different curves, it is possible to make an accurate estimation of the lateral offset between near-contact connector ferrules.

Once the lateral offset is known, the connector IL value associated with this offset can be calculated. The difference between this predicted connector IL via lateral offset IL curve fitting and the estimated DUT IL (calculated using methods described in the previous section) provides an estimate of jumper cable fiber link IL (i.e., the IL of reference optical fiber 62). This estimate of the jumper cable fiber link IL can then be compared with the estimate computed at large ferrule gap distances.

Used together, these methods can be used to refine the DUT connecter IL value by separating out any influence of jumper cable fiber link IL. When the jumper cable connectors are reversed in the measurement system to characterize the opposite connector a second estimate of fiber link IL can be made. This second measurement of fiber link IL can be used to further refine DUT connector IL measurements made previously on both jumper cable connectors. Thus, an aspect of the method disclosed herein includes accounting for sources of insertion loss besides that associated directly with DUT connector 70D so that the insertion loss for just the DUT connector can be measured accurately.

After an IL measurement cycle is complete, the reference ferrule 90R is retracted from the near-contact position. If system 10 determines that repeat measurements are required to correct detected errors or to improve measurement accuracy, the reference ferrule 90R is only partially retracted. The partial retraction distance must:

1) Overcome the hysteresis effect introduced by the resilient member, so that the ferrule slides within the member away from the contact point (typically requires 100 µm stage travel).
2) Provide sufficient ferrule gap distance to make another fine estimate of ferrule contact position (typically about 70 µm to 100 µm of stage travel).
3) Provide sufficient ferrule gap distance to make another near contact DUT IL estimate (typically about 30 µm of stage travel).

A typical retraction distance is about 200 µm, so for stage velocities of v=0.1 to 1.0 mm/sec, the additional measurement cycle time required for retraction is 2 to 0.2 seconds, respectively.

Figure 18:
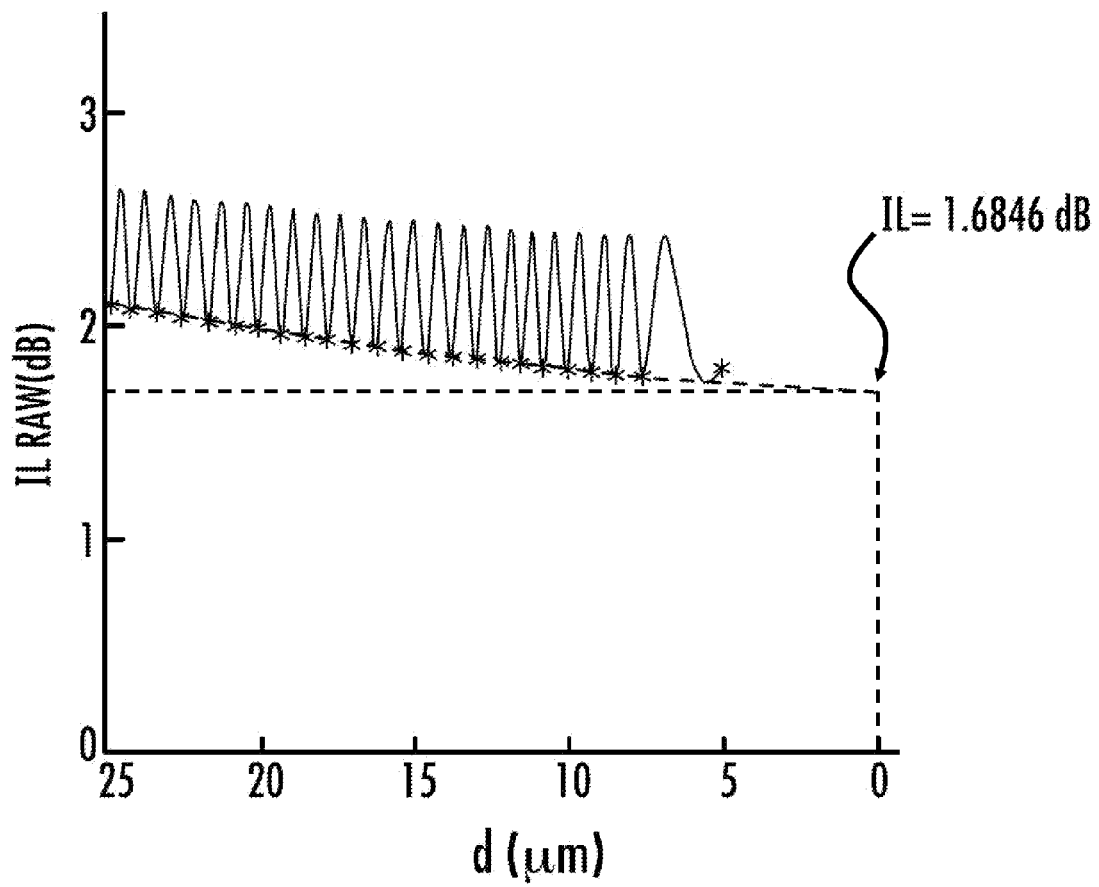
FIG. 18 is similar to FIG. 16 and shows another example of the variation in the fringe pitch of the insertion loss curve that indicates grip and slip between the connector ferrule and the alignment member, and also shows the extrapolation of the IL minima to the contact position where d=0 and where the estimated insertion loss is IL=1.6846 dB.

System 10 can detect errors over the course of a measurement that it can address (depending on severity) by either prompting the operator for a repeat measurement or automatically implementing a repeat measurement. Example errors include:

1) No light observed: Possible dark fiber
2) Extremely high IL after initial ferrule insertion into member: Possible end face contamination or bad jumper
3) Constant IL value: Ferrule not sliding in member
4) Sudden variations in IL value, fringe period or fringe amplitude: Grip and slip events and/or lateral misalignment of ferrule in member due to ferrule/ferrule or ferrule/member geometry mismatch.
5) Gradual change in fringe period immediately before contact: Possible end face contamination, where contamination is gradually compressed under ferrule end face pressure, as shown in FIG. 18, which presents a plot similar to FIG. 13, wherein a variation in fringe pitch just before ferrule contact indicates the presence of contamination on a ferrule end face.

Multiple IL measurements on the same DUT connector 70D can improve measurement accuracy by discarding or averaging out outlier measurements. Since most of the measurement cycle is spent determining the ferrule contact position as opposed to performing fine measurements of DUT IL, repeat DUT IL measurements can be performed rapidly with minimal influence on measurement cycle. Multiple measurements can be programmed to be performed for every DUT connector measurement, for some sampled subset of DUT connector measurements, or after certain error events are detected.

After all measurements on a given DUT connector 70D are complete, the reference ferrule 90R is partially retracted and the DUT connector removed from alignment member 200. A holder or fixture (not shown) can be used to hold alignment member 200 to prevent the alignment member from being retracted with the DUT connector ferrule 90D. If the connector 68D on the opposite end of the reference cable 60D has not yet been measured, it can be measured.

The discussion herein makes measurements of DUT IL, where the DUT connector 70D is located at one end of an optical jumper cable 60D. It will be understood that DUT connector 70D can be operably arranged on any optical component besides an optical fiber, including passive optical devices such as 1:2 and 1:N splitters, combiners, tap monitors, WDM (Wavelength Division Multiplexer) filters, gain flattening filters, AWG (Arrayed Waveguide Grating) multiplexers and demultiplexers, polarizers, isolators, circulators. It can also be applied to active optical devices, such as 1×N optical switches, laser sources, SOAs (Semiconductor Optical Amplifiers), fiber-based amplifiers, VOAs (Variable Optical Attenuators) and modulators.

While the measurement description is based on light coupled in one direction through the gap defined by two optical connectors 70R and 70D in a common passive alignment element 200 (such as a ceramic sleeve), it can also be applied to single-port devices, such as photodetectors and MEMS (Micro-Electro-Mechanical System)-based retroreflective VOAs (Variable Optical Attenuators). In these devices, the measurement may be implemented in a bidirectional reflective mode, using a circulator for both launching an optical interrogation signal into the single port device and for capturing a reflected signal that contains information on how much light was coupled in the DUT connector. Time-Domain Reflectometry may be useful for distinguishing light back-reflected off the DUT ferrule end face from light reflected off optical elements internal to the single-port device.

The methods disclosed herein are applicable to any kind of connector 70 that uses passive alignment features for fiber core alignment that extends in a direction parallel to the fiber axis. For example, the passive alignment feature may be the alignment member 200 (ceramic sleeve) that aligns connector ferrules 90R and 90D (as in SC and LC connectors), or precision pins that fit into molded holes on the connector end face (as in MTP and MT-RJ connectors). The connector end faces can be polished flat (UPC) or angled (APC), and the fibers can be single-mode or multimode.

System 10 can be designed to automatically measure connector IL for connectors 70 on both ends of the jumper by providing additional automation within the measurement enclosure. Instead of having a dedicated measurement port and detector port, the front panel of the measurement system would provide two ports, port A and port B. The operator would insert jumper cable connector A into port A and jumper cable connector B into port B. Then the measurement system would measure the IL for connector A, followed by the IL for connector B.

Internal to the measurement system 10, the reference connector mount 82 and stage 80 can be mounted on one movable platform (not shown), while the broad-area detector for measuring the amount of light coupled through the DUT jumper cable can be mounted on a second movable platform. The moving platforms can be repositioned so that the measurement components align with connector A or connector B as needed.

The reference-connector mount (fixture) 82 and stage 80 and the broad area detector can also be mounted on a common platform. The common platform could be a rotary stage or carousel that reverses the positions of the two measurement components, or a linear stage that slides back and forth to align with connector A and connector B as needed. In the latter case, it would be necessary to duplicate one of the measurement components (either the reference connector mount and stage or the broad area detector) so that the linear motion would result in alignment of the appropriate type measurement component with a given jumper cable connector.

This configuration would reduce overall connector IL measurement cycle time, since the operator would need to handle the DUT jumper cable during measurement system mounting and removal half as much as in the previous case. The configuration is well-suited for measurements techniques that separately estimate jumper cable fiber link IL and connector IL, since the various measurements could all be easily correlated to each other for the single DUT jumper cable mounted in system 10.

The near-contact IL measurement methods disclosed herein are also applicable to multimode fiber connectors and APC connectors. A universal measurement bench can be developed that simultaneously supports a variety of different connector and fiber types, including:

1) Support for single-mode and multimode fiber connections
2) Support for UPC and APC connectors
3) Support for SC and LC connectors Experiments have shown that using the same SC reference connector and SC-compatible member both SC single-mode and SC multimode fiber connectors and both SC-UPC and SC-APC connectors can be measured. Two possible solutions are described below.

One solution for implementing a universal bench that could support both SC and LC connectors includes interchangeable reference connector/member measurement modules, where one module would provide an SC reference and alignment member, while the other module would contain an LC connector and alignment member. The modules would be designed to be easily replaceable by an operator, and they would provide standardized interfaces to other optical and mechanical components in the measurement system to simplify their insertion into and removal from the measurement system. The standard interfaces can include ports presented on the exterior of the measurement system that are dedicated to receive specific types of connectors. This modular solution is practical because in typical jumper cable production runs the same type of cable is fabricated over and over, minimizing the frequency with which the interchangeable reference connector/alignment-member measurement module would need to be changed.

In another solution, a universal reference connector and passive alignment fixture is incorporated into system 10. The universal fixture is designed to accommodate different connector ferrules with different diameters and lengths. For example, the passive alignment fixture could be any of the coaxial alignment approaches described herein. Modifications can be made to the way the connector housings 72 are gripped within the connector ports, so that the different external sizes and features of the connector housing could be engaged properly to hold connectors of various types in position during measurements.

In either solution, the majority of components in system 10, such as detectors, motion stages and computer controllers, remain the same. Near-contact IL measurement algorithms can be tuned to operate with specific connector types using the same algorithm with different process parameters. The connector type could be entered by the operator or automatically discovered by system 10 after replacement of a DUT jumper cable or interchangeable reference connector/alignment-member measurement modules.

Other functions can be integrated into the near-contact measurement system to improve throughput, simplify component handing, or boost component yield. Immediately after DUT jumper cable connector insertion into system 10, a visual ferrule end inspection can examine the fiber and ferrule end faces for contamination and damage. If contamination is detected, the measurement system can either stop the measurement and recommend that the operator remove the problem connector and re-clean its ferrule end face, or automatically clean the ferrule end face within the system.

Automation can be added to system 10 to support more complex optical components, such as 1:N splitters, that may involve large numbers of connectors. The component and its connectors can be mounted in a common cassette or fixture so that individual connector pairs can be characterized using automated system that can selects specific connectors and insert or align them to the measurement system front panel measurement and detector ports.

Measurement Results

Measurement data from an actual measurement run are now discussed with reference to near-contact IL measurements made on a single-mode SC-UPC connector 70D. Measurement process parameters associated with the five measurement steps are presented in Table 1, below.

TABLE 1

Near-contact measurement steps

| Measurement step number | 1 | 2 | 3 | 4 | 5 |
|---|---|---|---|---|---|
| Step name | Lead-in | Coarse contact prediction | Fine contact prediction | Fine IL measurement | Retraction |
| Description | Close gap between connector ferrules from initial user loading position gap to gap suitable for initiation of contact prediction | Reduce gap while measuring IL, enabling coarse estimate of contact position (to within ±30 um) | Reduce gap while measuring IL, enabling fine estimate of contact position (to within ±3 um) | High accuracy measurement of DUT IL near contact | Increase gap between connector ferrules prior to user removal of DUT connector |
| Step start gap (um) | 2000 | 700 | 200 | 30 | 5 |
| Measurement start gap (um) | N/A | 500 | 70 | 20 | N/A |
| Step end gap (um) | 700 | 200 | 30 | 5 | 2000 |

TABLE 1-continued

Near-contact measurement steps

| Measurement step number | 1 | 2 | 3 | 4 | 5 |
|---|---|---|---|---|---|
| Stage velocity (um/sec) | 1000 | 100 | 10 | 10 | 1000 |
| Source for initial contact position estimate | Previous IL measurements | Previous IL measurements | Step 2 | Step 3 | Step 3 |
| Initial contact position uncertainty (um) | ±100 | ±100 | ±30 | ±2 | ±2 |
| Final contact position uncertainty (um) | ±100 | ±30 | ±2 | ±2 | ±2 |
| End of step IL trigger for part fail (dB) | 17 | 5 | 2.5 | 0.25 | N/A |
| Step duration (sec) | 1.3 | 5 | 17 | 2.5 | 1.995 |

In Step 1, the operator mounts DUT connector 70D into the measurement stage 150 of system 10 (FIG. 1). The connector 68D at the opposite end of the jumper cable is inserted into (broad-area) detector 40-2. The DUT connector 70D is manually loaded into alignment member 200, with DUT ferrule 90D moving toward the reference ferrule 90R of reference connector 70R (see also FIG. 3). After the DUT connector 70D is secured to the mounting fixture 150 by the operator, the resulting gap G had a gap distance d in the range from 2 mm to 3 mm.

System 10 can monitor the IL at this point to make a first estimate of the ferrule gap distance d. In this approach, the IL is measured and then the ferrule gap distance d is estimated using previous measurements or expected IL variations from simulation plots, such as shown in FIG. 4. Alternatively, a coarse contact prediction run (similar to the one implemented in Step 2) can be implemented to provide an initial estimate of ferrule gap distance d.

In the measurement example, the ferrule contact position $P_C$ is initially estimated to be $P_C$=16.368 mm. This contact position estimate includes an error margin (e.g., at least 200 μm) so that early state measurement steps can be guaranteed to not make ferrule-to-ferrule contact.

Figure 19:
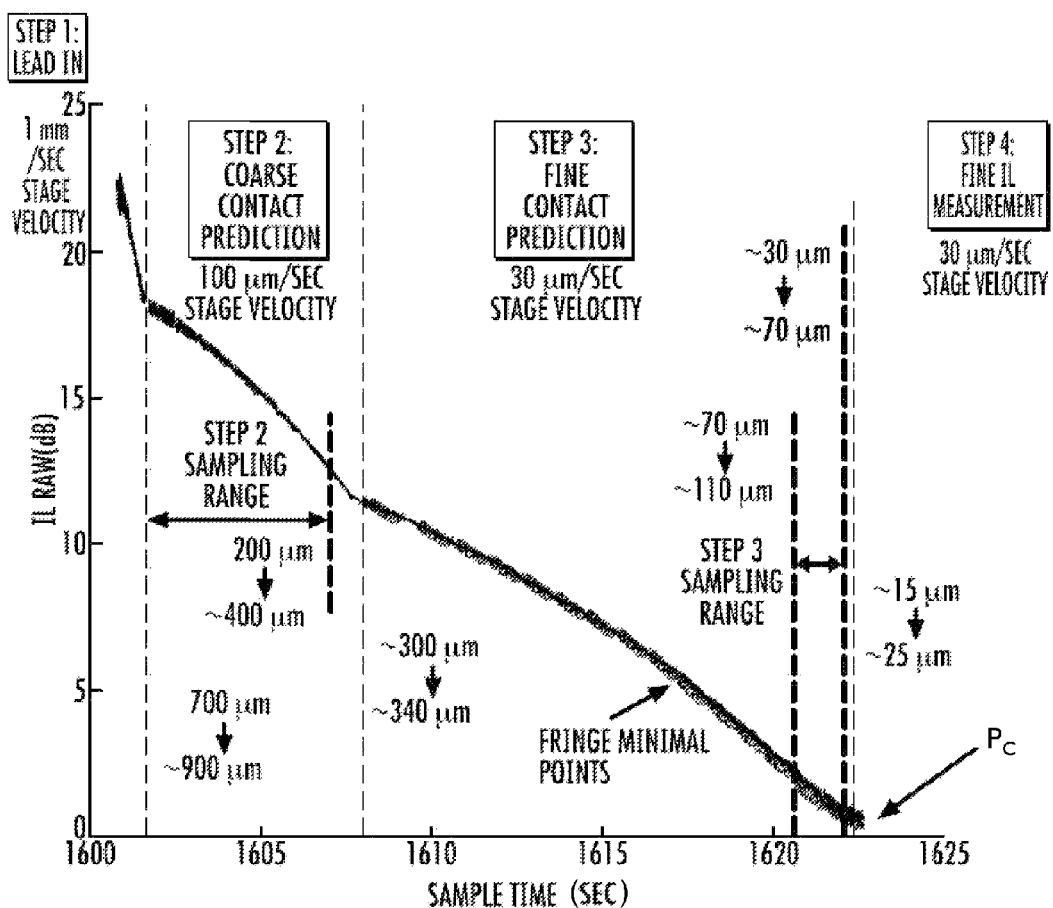
FIG. 19 is a plot of the raw IL (dB) versus sample time (seconds) for IL measurement data, showing regions for measurement steps 1-4 over a 22.5 second measurement cycle.

FIG. 19 is a plot of the raw IL (dB) versus the sample time t (seconds) and shows measurement steps 1 through 4 over a 22.5 second measurement cycle. Vertical dashed lines separating each measurement step. The distances shown next to the dashed vertical lines indicate estimated gap distances d. For example, the leftmost vertical dashed line has d=700 μm, which corresponds to the Step 1 estimated gap position. This same position also has about 900 μm, which corresponds to the estimated gap distance at the same location after the next estimation of the gap. This same format is repeated for later measurement step positions. This highlights how measurement steps continually refine the estimate for ferrule gap distance d, reducing the uncertainty in each step, until the contact location is known (typically to within about ±2.0 μm).

The left side of the plot of FIG. 19 shows data recorded during Step 1. The initial steep slope of the IL curve in Step 1 is due to the rapid translation speed v of the stage 80 (e.g., v=1 mm/sec). Once the stage 80 is moved to what is believed to be the target ferrule gap distance (700 μm in this example), the Step 1 lead-in terminates, and the measurement proceeds with Step 2.

In Step 2, a coarse estimate of the ferrule contact position is made by measuring the IL over the Step 1 estimated gap distance of 700 μm to 200 μm. After completing this measurement, the IL data is used to calculate a new estimate of ferrule contact position using the methods described above. In this example, the Step 2 estimate for ferrule contact position is $P_C$=16.5742 mm. Comparing this result to the Step 1 contact estimate above of 16.368 mm, it can be seen that the new contact estimate is about 206 μm farther away. Based on this result, the related Step 2 and Step 3 measurement position estimates are also shown. It is noted here that the effective gap distance is the negative of the ferrule gap distance.

The Step 2 estimate of contact position is typically within ±30 μm of the actual contact position. Experiments conducted to evaluate the variation in contact position estimation over 25 measurement runs to ferrule contact using the same DUT connector 70D, reference connector 70R and alignment member 200. Measurements were made all the way to ferrule contact (unlike the typical near-contact measurement approach) so that the absolute contact position would be known. Step 2 calculations for estimated contact were made using data from the 25 measurement runs at stage positions away from contact (700 μm to 200 μm gap distance d).

Figure 20:
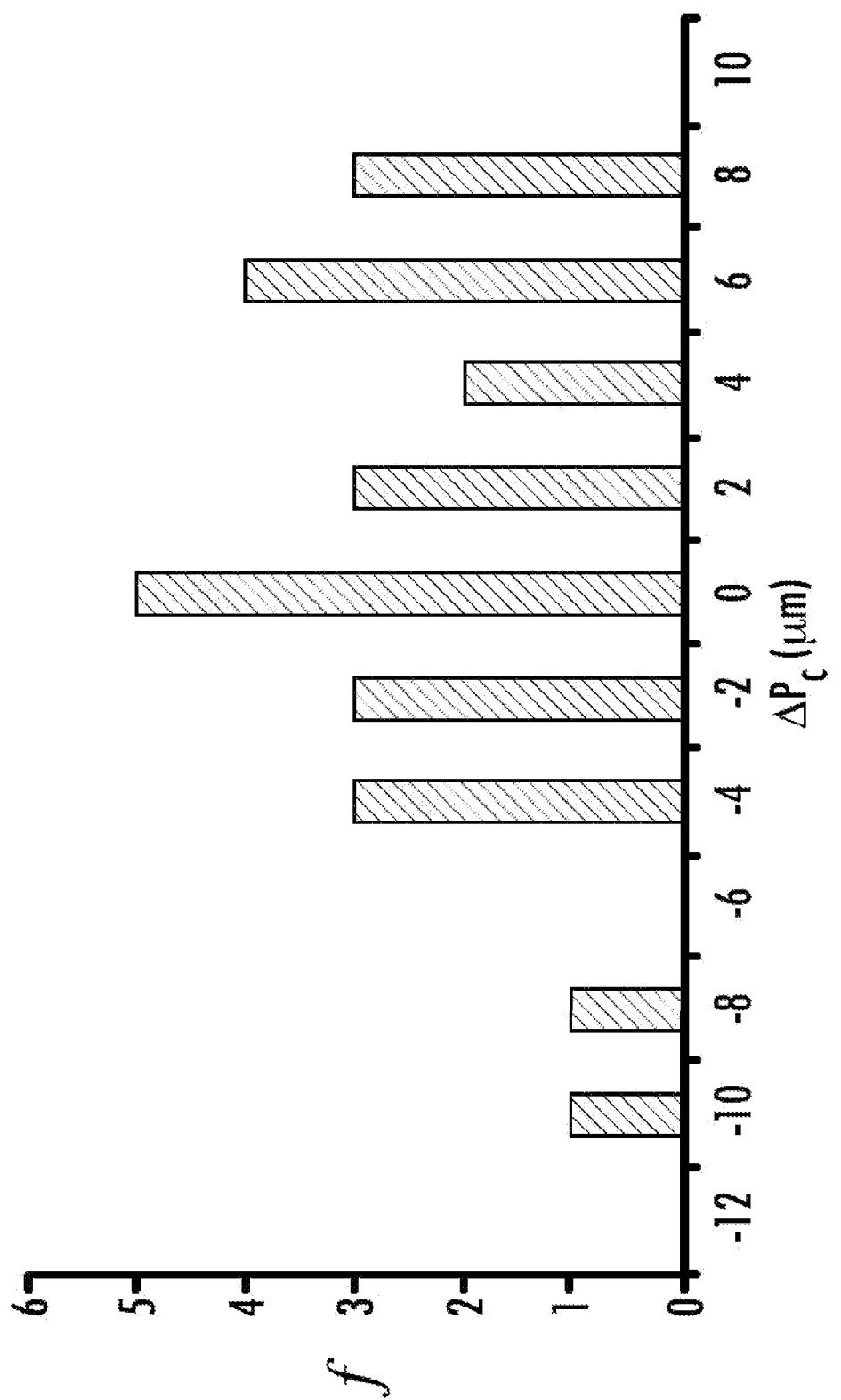
FIG. 20 plots the frequency f versus the variation $\Delta P_C$ (μm) in the predicted contact position for 25 measurement runs.

Measurement results indicate that the Step 2 linear extrapolation method under-predicted the contact position $P_C$ by an average of 55.4 μm. This average underestimation can be made equal to the contact position offset term $z_c$ to eliminate the under-prediction error. More importantly, the standard deviation of the estimated contact positions σ=5.0 μm. FIG. 20 plots the frequency f versus the variation ΔP (μm) in the predicted contact position for 25 measurement runs. The variation is small enough to enable the transition to Step 3 measurements without danger of making ferrule contact, since the Step 3 measurement ends at a distance 30 μm from contact.

Figure 21:
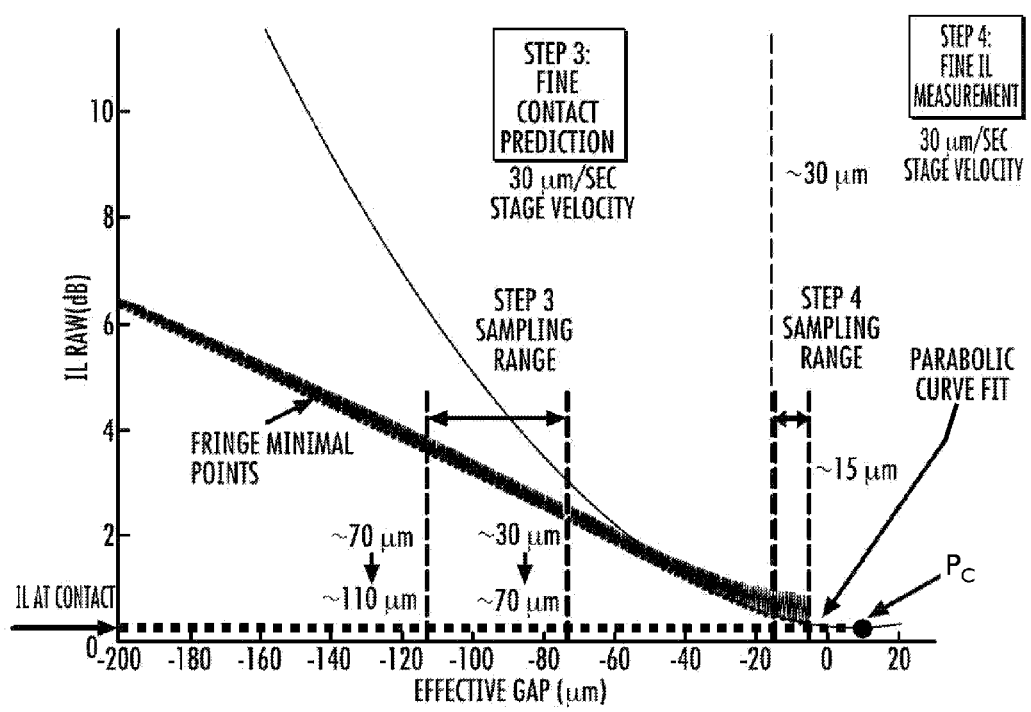
FIG. 21 is similar to FIG. 19 and shows the data for step 3 and step 4.

In Step 3, a fine estimate of contact position is made by measuring IL over the Step 2 estimated gap positions of 70 μm to 30 μm. After completing this measurement, the IL data is used to calculate a new estimate of ferrule contact position. In this example, the Step 3 estimate for the ferrule contact position is 16.6163 mm. Comparing this result to the Step 2 contact estimate above (16.5742 mm), it can be seen that the new contact estimate is about 42 μm farther away than the previous estimate. Based on this result, FIG. 19 shows related Step 2 and Step 3 measurement position estimates in purple. FIG. 21 is similar to FIG. 19 and shows the data for Step 3 and Step 4. Note that the horizontal axis plots gap distance according to the estimated values for Step 3.

Figure 22:
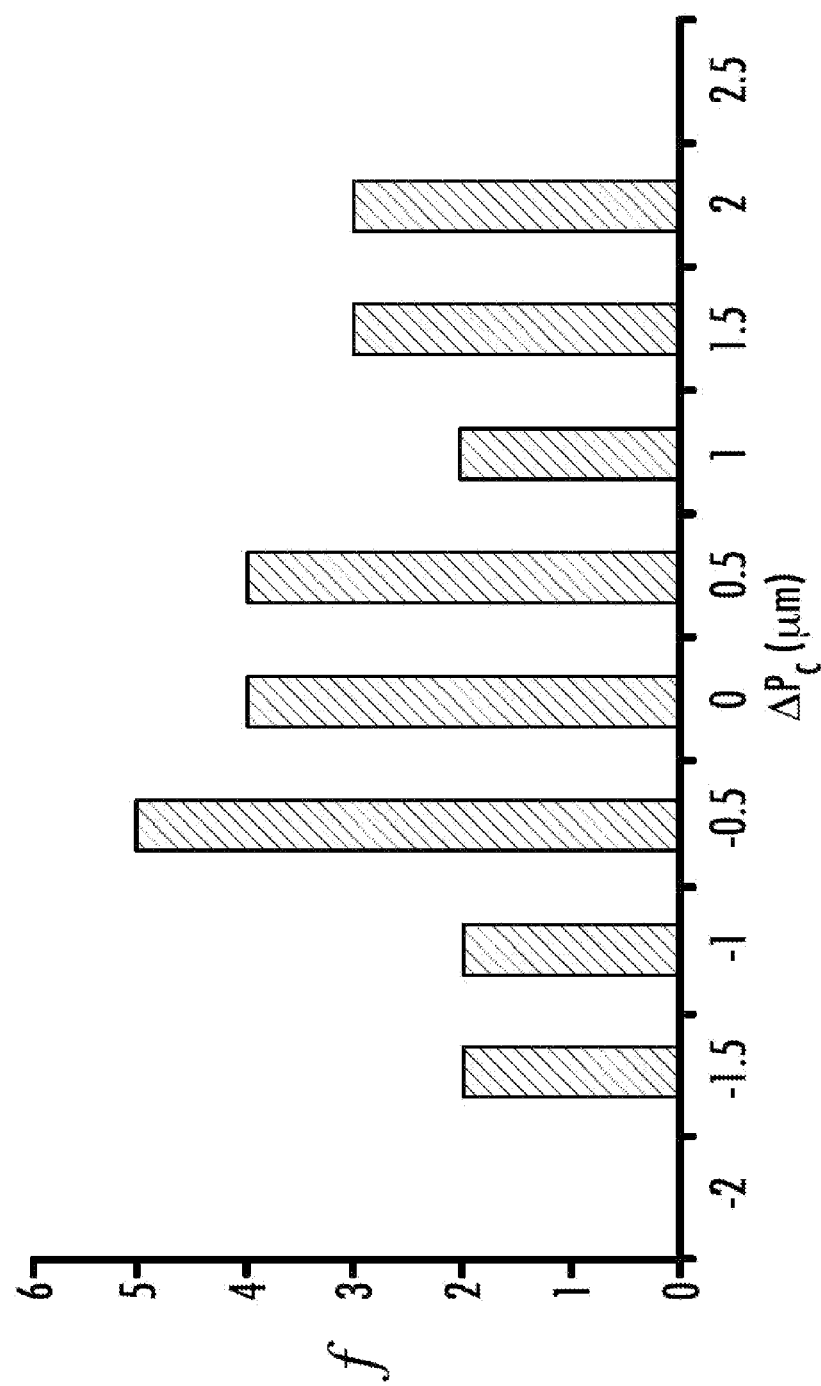
FIG. 22 is similar to FIG. 20 and shows the data for step 3.

Estimates of Step 3 uncertainty in contact position were made using the same 25 measurement runs described above in Section 5.3. Calculations were based on IL data measured over the 70 μm to 30 μm ferrule gap separation estimated by the Step 2 measurements. Measurement results indicate that the Step 3 linear extrapolation method under-predicted the contact position by an average of 2.4 μm. This average underestimation can be made equal to the contact position offset term $z_c$ to eliminate the under-prediction error. The standard deviation of the estimated contact positions σ=1.0 μm. A plot of the variation in contact position estimate is shown in FIG. 22 for 25 measurement runs. The variation is small enough to enable transition to Step 4 measurements without danger of making ferrule contact since the Step 4 measurement ends at a distance 5 µm from contact.

Figure 23:
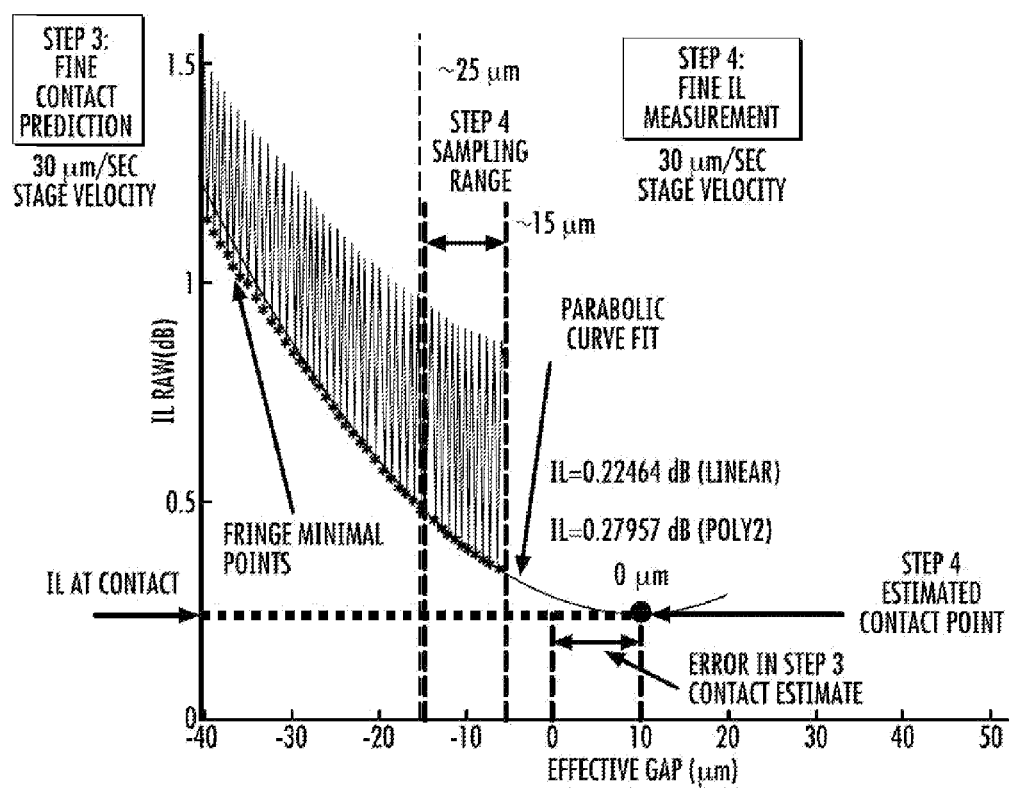
FIG. 23 is similar to FIG. 21 and provides a detailed view of IL data for the step 4 measurement.

In Step 4, measurements of IL near contact are used to predict DUT IL at contact. A set of measurement points recorded at ferrule gap distances d of 15 µm to 5 µm (based on the Step 3 estimate for ferrule contact) are fitted to a polynomial curve. FIG. 23 is similar to FIG. 21 and provides a detailed view of IL data for the Step 4 measurement. In this case, a parabolic curve is fitted to the IL data over 15 µm to 5 µm, resulting in a curve minimum that appears at a ferrule gap distance of −10 µm, based on the Step 3 contact gap estimate. The Step 3 contact position estimate has underestimated the contact location by about 10 µm. Fortunately, the measured IL data over the 15 µm to 5 µm range (actually obtained at ferrule gap distances of 25 µm to 15 µm) provides sufficient information on the shape of the curve so that an accurate parabolic fit can be made. The minimum value of the fitted parabola provides an estimate of DUT IL (0.25 dB).

Summarizing the measurement step estimates for ferrule contact position:
a) The Step 1 initial estimate for ferrule contact was off by about 258 µm.
b) The Step 2 estimate for ferrule contact position was off by about 52 µm.
c) The Step 3 estimate for ferrule contact position was off by about 10 µm.

Figure 24A:
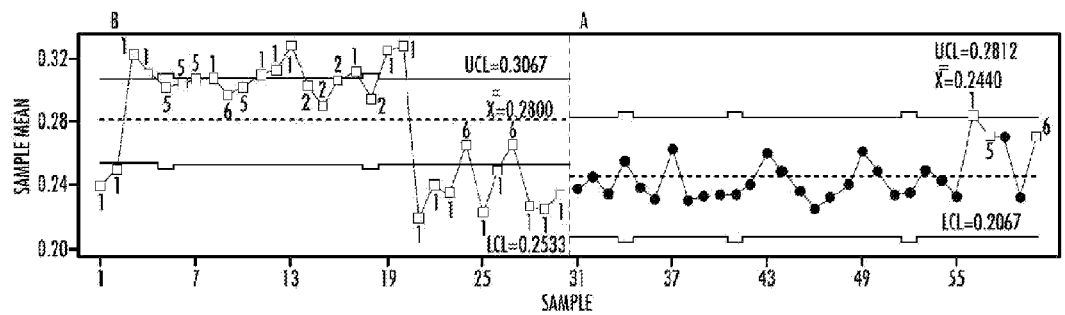
FIGS. 24A and 24B respectively plot the sample mean and same range versus sample number for repeat measurement runs performed on two different DUT/connector/alignment-member combinations, where one combination is used for samples 1-30 and a different combination is used for samples 31-60.
Figure 24B:
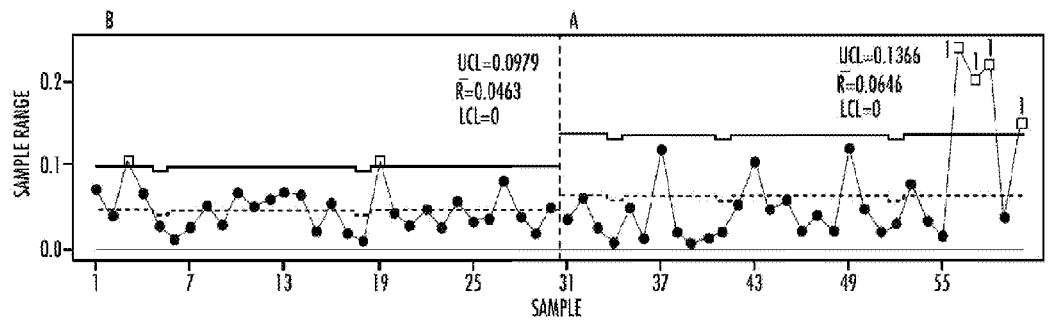

These values are larger than measured variations in predicted ferrule contact position $P_C$ for Step 2 and Step 3 presented above (±10.0 µm and ±2.0 µm, respectively). The measurement run described above represents an outlier run based on 10 runs using the same DUT connector 70D, reference connector 70R and alignment member 200. Even so, the estimated value for DUT IL based on this particular run is only 0.05 dB away from the average value for the 10 runs. The DUT IL results for repeat measurement runs performed on two different DUT/connector/member combinations (about 30 runs for each configuration) are shown in FIGS. 24A and 24B, which plot the sample mean and sample range respectively versus sample number for repeat measurement runs performed on two different DUT/connector/member combinations (where one combination is used for samples 1-30 and a different combination is used for samples 31-60). The plots show that variations in DUT IL prediction generally fall within a range of ±0.04 dB. While there are some outliers in the data, and a sudden drift in measurement values appears after sample 20, overall the approach provides a low-variation method for near-contact characterization of DUT IL.

After the measurement run is complete, the DUT connector 70D is removed from alignment member 200. If repeat measurements are made, the ferrule can be partially retracted within the alignment member 200 before initiating the next measurement.

Measurements on Multimode Connectors

Multimode optical fibers provide a large diameter core (50 µm to 62.5 µm) that relaxes lateral alignment tolerances for low-loss coupling to other multimode fibers. Typical lateral alignment tolerances for multimode fibers (2 µm to 5 µm) are an order of magnitude larger than tolerances for single-mode fiber interconnections, enabling low cost manufacturing techniques for fiber components.

The large core diameter used in multimode fibers enables light propagation in a large number of modes (e.g., 700-1000 unique modes for a typical data communications fiber). A major disadvantage of multimode fibers is that the various multimode fiber modes propagate with slightly different velocities. At the transmitting end of an optical fiber, light from an optical source is generally coupled into a large number of fiber modes simultaneously. Since each mode propagates at a slightly different velocity, square data pulses modulated in time onto the fiber to spread out and eventually blend with neighboring pulses by the time they reach then end of the fiber. If the fiber link is long enough this introducing unacceptable bit errors in transmitted data streams at sufficiently high data rates.

Higher data transmission rates can be achieved with multimode fibers if the core index profile is graded so that the modal dispersion due to the different mode propagation velocities is reduced. Even so, long fiber links will eventually suffer bandwidth limitations from the differences in mode propagation that still exist. In short links commonly spanned by jumper cables, modal dispersion issues are less of a limiting factor on link bandwidth, so lower-cost step index-cores are commonly used. These step index cores support modes that propagate at many different velocities. This fact is actually an advantage for eliminating many of the interference fringe effects that appear at fiber gaps.

Modeling results show that for large gap distances d, the overlap of interference contributions from many modes will tend to average out any fringe peaks and troughs, resulting in a smooth IL curve that gradually increases as gap distance is increased. At small gap distances, interference fringes are expected to appear because of all the modes accumulating roughly with the same phase as they follow the short reflection path between fiber end faces.

Interference fringes at a fiber gap appear because two or more optical signals interact that are in phase (in the case of constructive interference) or out of phase (in the case of destructive interference). For example, in the case of a single-mode fiber, light propagates across an air gap between fibers with a propagation constant (or wave number) of $k \approx 2\pi/\lambda$. Since the index of refraction of the fiber core is higher than the index of refraction of the air gap, a fraction of gap light propagates directly into the receiving fiber, while another portion is reflected away from it. Based on this reflection at the receiving fiber face, there are two optical paths set up for any mode propagating with propagation constant k:
1) A direct transmission path that propagates into the receiving fiber immediately.
2) A reflective path where light reflects off the receiving fiber face, then the transmitting fiber face, and then back across the gap to the receiving fiber face.

The path length difference x between these two paths is 2d, where d is the gap separation distance. The phase difference along this path is given by the propagation constant times the path length difference, or kx or 2kd. When the phase difference is a multiple of $2\pi$, constructive interference will result in complete transmission of light from both paths. When the phase difference is $\pi$, $3\pi$, $5\pi$, . . . destructive interference will result.

Constructive interference peaks will occur at gap separations where $2n\pi=kx=2kd=4\pi d/\lambda$ for n equal to any positive integer. Solving for d yields $d=n\pi/k=n\lambda/2$. Similarly, destructive interference peaks occur at $d=(n+\frac{1}{2})\lambda/2$. These are the interference fringe peaks and troughs observed in gaps between single-mode fibers.

In multimode fibers, many modes are supported that propagate with a variety of propagation constants. For a given mode m the phase difference associated with the single reflection path vs. the transmission path is $k_m x$, where $k_m$ is the propagation constant of mode m, and x is the total path length (2d in our case). For small gap distances where the beam doesn't diffract significantly (d<<500 μm for λ=1.55 μm), the IL peaks associated with destructive interference occur at $k_m x = \pi, 3\pi, 5\pi$, etc.

We can describe k as $k_0 + \Delta k_m$, where:
$k_0$ is the propagation constant for the lowest order (fundamental) mode.
$\Delta k_m$ is the difference in wave number associated with a given multimode fiber mode m away from the fundamental mode.

Expanding the expression for phase difference we get:

$$k_m x = (k_0 + \Delta k_m) \cdot 2d = 2dk_0 + 2d\Delta k_m$$

To identify locations where constructive interference occurs, we can solve $2n\pi = k_m x = (k_0 + \Delta k_m) \cdot 2d$ for d.

$$d = \frac{2n\pi}{2(k_0 + \Delta k_m)} = \frac{n\pi}{k_0 + \Delta k_m} \cdot \frac{k_0 \cdot \Delta k_m}{k_0 \cdot \Delta k_m} = \frac{n\pi(k_0 - \Delta k_m)}{k_0^2 + \Delta k_m^2}$$

Since $k_0 >> \Delta k_m$ for typical multimode fibers we know that $k_0^2 >> \Delta k_m^2$ so that the $\Delta k_m^2$ term in the denominator can be ignored.

$$d = \frac{n\pi(k_0 - \Delta k_m)}{k_0^2 + \Delta k_m^2} \cong \frac{n\pi(k_0 - \Delta k_m)}{k_0^2} = \frac{n\pi}{k_0} - \frac{n\pi\Delta k_m}{k_0^2}$$

Here we see that as long as the second term is small relative to the first, each of the m modes will have its constructive interference fringes overlap with each other for a gap distances $d = n\pi/k_0$. Since each mode still accumulates a different phase as it propagates along the length of the fiber, there is no guarantee that all the constructive fringes from all the modes will add together constructively. In fact, they will tend to add with random phases, so that the resulting amplitude of the interference patterns from many modes will likely be reduced.

As the value of the second term in the above equation for d increases, eventually the position of the constructive interference peak for a given mode m will shift to correspond to a gap distance exactly between the constructive interference peaks for the fundamental mode, corresponding to a change in gap distance of λ/4. When this happens, there is a strong possibility that, even if light from the fundamental mode and the higher order mode m is in phase, spatially the interference peaks of the individual modes will be shifted so they cancel out each other. This condition will occur when $$\frac{\lambda}{4} = \frac{n\pi\Delta k_m}{k_0^2}.$$

solving for n yields:

$$n = \frac{k_0^2 \lambda}{4\pi\Delta k_m} = \frac{k_0^2}{2k_0 \Delta k_m} = \frac{k_0}{2\Delta k_m}.$$

Depending on the values for $k_0$ and $\Delta k_m$ after a gap separation distance corresponding to n fringes peaks significant blurring of interference fringes from the various fiber modes is expected. This distance s can be estimated as $$s = \frac{n\lambda}{2} = \frac{k_0}{2\Delta k_m} \frac{\lambda}{2} = \frac{k_0}{2\Delta k_m} \frac{\lambda\pi}{2\pi} = \frac{k_0}{2\Delta k_m} \frac{\pi}{k_0} = \frac{\pi}{2\Delta k_m}.$$

The point is that as the gap distances increase to s and beyond, interference fringes for the various modes should eventually become indistinguishable, so that individual fringes disappear and the IL curve follows a smooth, fringeless profile.

Simulation Results for Multimode Fibers

A simple Gaussian beam propagation model was developed for modeling multimode coupling between multimode fibers with an air gap in between. To approximate the guided modes of the multimode fibers, light from a source fiber with 20 Gaussian modes with slightly different propagation velocities was coupled into a single receiving fiber. The propagation constants for the 20 modes were selected from a distribution similar to the one expected for a multimode fiber with an NA (numerical aperture) of 0.2. A 50 μm diameter optical fiber core was selected for both fibers (matching the diameter of standard multimode fibers) so that losses due to diffraction effects at small gap distances would be negligible. The spatial distribution of optical power across individual modes was assumed to be Gaussian instead of the normal, highly oscillatory structure common to higher order multimode fiber modes.

This approximation is reasonable for this multimode fiber coupling case we aren't concerned with how energy from one mode couples into other modes in the receiving fiber. Instead, the assumption is that all light that falls on the receiving fiber end face from the 20 modes will be add constructively or destructively (depending on the amplitudes and relative phases of the modes), and that all resulting power will completely couple into some combination of receiving fiber modes. The simulation was carried out at λ=1550 nm.

Each of the 20 modes was given 1/20 of the total power, and a randomly generated phase value. The simulation was conducted by holding the phase of each launched mode at the initial phase value as the gap between the two fibers was increased. The two fibers were misaligned axially without introducing any lateral or angular misalignment. In the simulation the gap between the two fibers was increased as perfect lateral and angular alignment was maintained.

Figure 25:
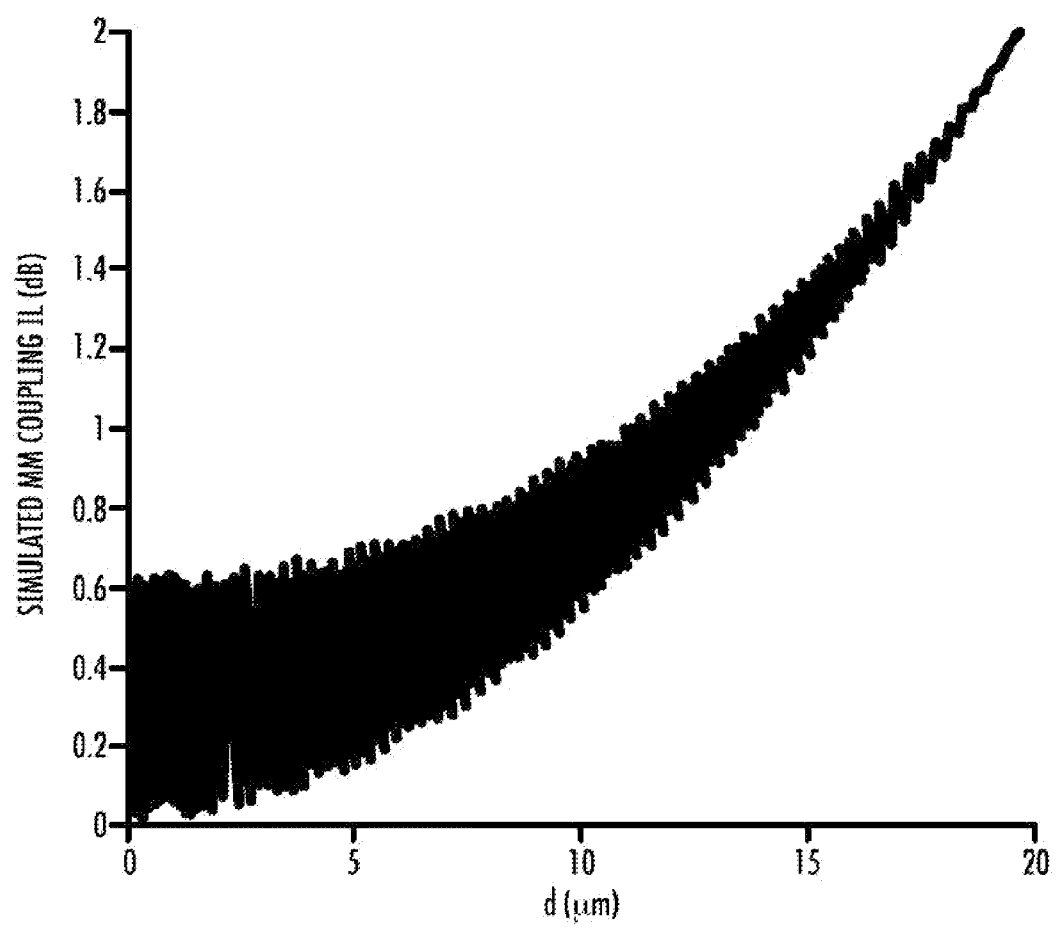
FIG. 25 plots the simulated multimode coupling IL (dB) versus the gap distance d (μm), and shows that the amplitude of the total coupled power transferred across the gap exhibits fringes near the contact position at d=0.

FIG. 25 plots the simulated MM coupling IL (dB) versus the gap distance d (μm). As expected from the theoretical model described above, the amplitude of the total coupled power transferred across the gap exhibits fringes near the contact distance of d=0. As the contact distance is increased, the amplitude of the fringes drops off, until at a sufficiently large gap distance the fringes disappear. Since the model is based on a number of key modal parameters that are difficult to measure easily (such as modal power distribution and modal phase distribution) it is difficult to go deeper into confirming the expected trend toward disappearance of fringes as $s << \pi/2\Delta k_m$.

The plot of FIG. 25 shows that as the ferrule gap distance d is reduced to very small values that are near contact (e.g., d of about 5 μm to 10 μm), fringes will appear in fiber IL measurements. The appearance of fringes can therefore be used as an intrinsic signal within the measured IL values that flags the onset of the near-contact condition. In fact, the amplitude of the fringes near contact provides direct feedback on how far the ferrule end faces are from contact. This result should greatly simplify the operation of a near-contact IL measurement system for multimode fibers.

Measurements Using Multi Mode Fibers

An experiment was conducted to evaluate how the measured IL changes as the gap distance d between multimode fiber end faces is reduced. A 850 nm light source 20 was used to couple into a reference multimode jumper cable 60R with a multimode fiber 62R, with one end mounted in fixture 82 in system 10 and inserted into one end of alignment member 200. An end of a DUT multimode fiber 62D was inserted into the other end of alignment member 200 and moved in and out to assess the IL vs. gap distance d. Measurements were conducted over gap distances d of 2.6 mm down to 400 µm at stage velocity of v=100 µm/sec, and then at v=10 µm/sec to 100 µm beyond contact. A total of five measurements were made.

Figure 26A:
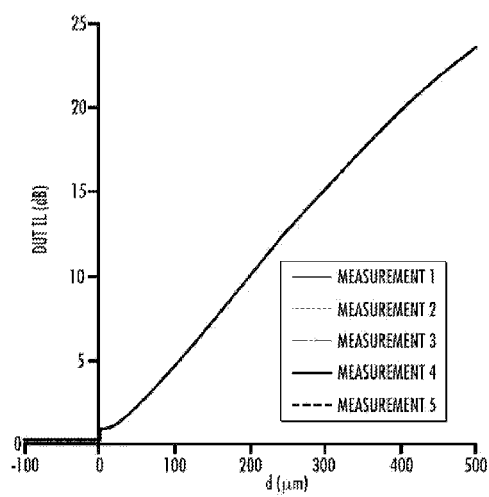
FIGS. 26A and 26B are plots of the DUT IL (dB) versus the gap distance d (μm) for relatively large gap distances (FIG. 26A) and relatively small gap distances (FIG. 26B) for five different measurements of multimode fiber connectors.
Figure 26B:
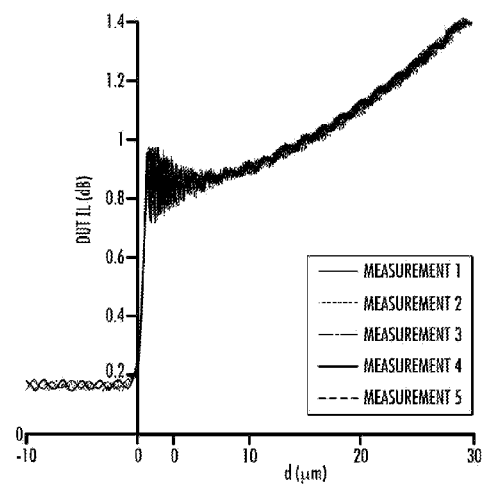

FIGS. 26A and 26B are plots of the DUT IL (dB) versus the gap distance d (µm) for relatively large gap distances (FIG. 26A) and relatively small gap distances (FIG. 26B). The general curve shape is as expected, with IL reduction from large value (25 dB) to low value (about 0.3 dB) moving toward the contact position. All five measurements exhibit very similar behavior over all ferrule gap separation distances d. The observed appearance of fringe-like features at large ferrule gap distances (e.g., d>400 µm) is likely due to detector noise, as system 10 was not optimized for measurements at 850 nm. Close examination of IL measurements in the region of large gap separations revealed occasional spikes where data is dramatically higher or lower than remaining data, possibly due to low detector power levels or some kind of artifact from reading the detector. They diminish in amplitude as coupled power levels increase toward contact.

Close to the contact position $P_C$, fringes appear rapidly in the IL measurement data, as predicted by theoretical modeling and simulation. The maximum amplitude of the interference fringes (about 0.2 dB) is significantly smaller than typical fringe amplitudes observed for single-mode fiber measurements. This is likely due to the particular was power and phase values vary for the various modes.

The sudden drop in IL at contact is unpredicted by the simulation model, which includes Fresnel effects at optical interfaces. The drop may be due to the elimination in Fresnel effects immediately prior to contact, but additional work is required to understand the effect fully. The important result is that both this sudden drop in IL and the appearance of fringes near contact can be used to provide optical feedback on when multimode fibers are approaching near-contact conditions.

Simulation and measurements have confirmed that detection of near-contact conditions is practical using multimode fibers, and that these measurements may be even easier to perform because of fringe feedback as d approaches the contact value of d=0.

Measurements for Single-Mode SC-APC Connectors

FIG. 27 is a cross-sectional view of example APC reference and DUT connectors 70R and 70D as operably arranged within alignment member 200, which can be an adapter used to form a connection between to optical fiber cables. APC connectors provide angle-polished ferrule end faces 92R, 92D and angle-polished fiber end faces 65R, 65D that are designed to minimize the amount of light that reflects off of the air/glass interfaces via Fresnel reflection and propagates back down the source fiber in reverse. Fiber and ferrule end faces are commonly angled at 8° to minimize back reflections. The connectors are keyed to ensure that upon insertion into a common member (e.g., an adapter) the angle polished ferrule end faces are rotated about the fiber axis so that their ferrule end faces are oriented parallel to each other.

FIG. 27 shows how light 22 reflects within the gap G. In practical couplers, the fiber end faces 65 or nearby ferrule end faces 92 are in contact with each other, so that only very small gaps G exist between fiber end faces, due to, for example fiber end face scratches introduced during fiber polishing operations or in field use.

When light 22 travels through the source (reference) fiber 62R and across the gap G, a large fraction of the light is transmitted into the receiving (DUT) fiber 62D. A small fraction is reflected off the receiving fiber end face so that it propagates back toward the source fiber end face 65R. When the back-reflected light strikes the angled source fiber interface, a large fraction of the light will be transmitted back into the source fiber in reverse. Since the fiber end face is angled at 8°, the back-reflected light cannot reenter the fiber in a direction parallel to the fiber axis. As a result, the back-reflected light couples back into the source fiber at an angle that corresponds to a significant angular misalignment. The single-mode fiber interconnections are sensitive to large angular misalignments introduced by the 8° fiber end face, and so the amount of light back-reflected into the source fiber is extremely low. For example, a typical return loss specification for an SC-APC fiber connector is −65 dB.

Modeling

In the near-contact measurement approach, the gap between connector ferrules in a common member is reduced as the IL is measured. FIG. 28 is similar to FIG. 27 and shows a cross-section view for a pair of APC connectors separated by a large gap distance d. As source light 22 exits the source fiber 62R and enters the gap G between the fibers, it refracts downward due to the 8° fiber end face angled polish. The light propagates across the gap G at an angle, so that it gradually shifts downward until it strikes the angled end face 65D of receiving fiber 62D. A large fraction of this light is transmitted into the receiving fiber 62D. As the light passes through the receiving fiber angled fiber end face, it is refracted so that it propagates in a direction that is parallel to the fiber core. This minimizes losses due to angular misalignment, but the downward shift of the light is equivalent to the introduction of a lateral misalignment. Since single-mode fiber coupling is highly sensitive to lateral misalignments, only a portion of the light transmitted into the receiving fiber is coupled into and guided by the core of the optical fiber. The remaining power is lost in the receiving fiber cladding.

As the gap distance d is increased, the measured IL is expected to drop off rapidly, since the effective receiving fiber lateral misalignment scales linearly with gap distance, while optical coupling IL generally varies with the square of lateral misalignment for small lateral offsets.

The light that reflects off the receiving fiber angled end face 65D propagates backwards toward the source fiber angled end face 65R while continuing to shift downward. After this light strikes the source fiber angled end face, a small fraction reflects off this interface and travels back toward the receiving fiber angled end face 65D. As with the directly transmitted light described above, most of the light that strikes the receiving fiber angled end face 65D is transmitted into the receiving fiber 62D and the propagation direction within the receiving fiber is parallel to the receiving fiber optical axis. The main problem is that, after two reflections in the fiber gap, the light beam is shifted down dramatically, so that the amount of power couple to the receiving fiber core is extremely low for anything but the smallest gap distances. Consequently, it can be concluded that:
1) At large gap distances d, the measured SP-APC IL values will lower than for the SC-UPC case, and that since very little power couples into the receiving fiber from the reflected light path interference fringes will not be visible.
2) At small gap distances d, at least a portion of the light from the reflected light path will couple into the receiving fiber core, resulting in interference fringes with amplitudes that drop off rapidly as the gap distance is increased.

Figure 29:
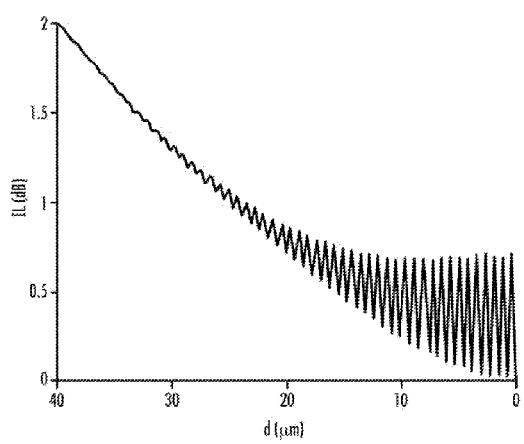
FIGS. 29 and 30 are plots of the insertion loss IL (dB) versus gap distance d (urn) for simulations (FIG. 29) and measured data (FIG. 30), wherein the plots show excellent agreement between the simulations and the measured data for APC connectors.

A Gaussian beam-based coupling model was implemented that supports:
1) Beam refraction/redirection at angled fiber/air interfaces.
2) Diffraction of beams across air gaps, including the amount of phase accumulation during propagation.
3) Splitting of beams into transmitted and reflected components at angled air/glass interfaces, including changes in beam power levels due to Fresnel loss affects.
4) Coupling losses when beams are laterally, angularly and axially misaligned prior to coupling into fiber cores The model was used to calculate how light would propagate from a source fiber core, across an 8° angled fiber gap and into a receiving fiber core, where the fiber gap distance is gradually increased during the simulation. Simulation results are shown in the plot of FIG. 29. The modeling shows that light will still couple between DUT and reference connector fibers when separated by relatively large gaps (d>1 mm to 2 mm) within alignment member 200.

While light intensity is reduced from UPC coupling case, coupled power levels are still within detector limits. Angled facets are shown to eliminate fringes until just before contact (within about 20 μm). As with the multimode fiber case the appearance of fringe amplitudes near contact can be used to rapidly estimate the contact position (especially since the amplitude of the interference fringes increases as the gap distance is reduced).

Measurement Results

Figure 30:
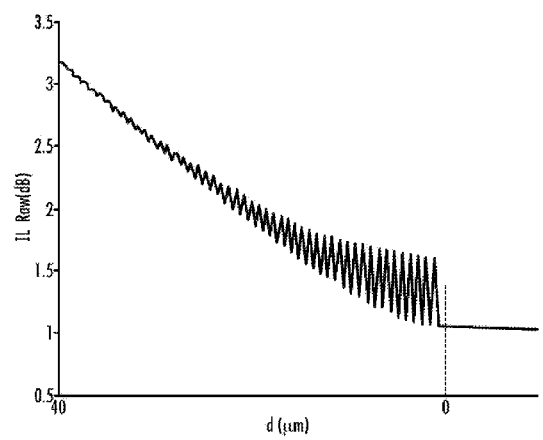

Measurements were carried out on SC-APC fibers and ferrules in DUT and reference connectors 70R and 70D using system 10, and the results are plotted in FIG. 30. Measurements agree well with simulation plot of FIG. 29, with all key features represented (fringes near contact, reduced IL at larger gap distances). Published measurements of optical coupling between fibers in ferrules polished at 10° end face angles reveal a similar pattern of fringes that appear rapidly as only when the ferrule gap distance is less than about 20 μm. Initial simulations and measurements confirm that the near-contact measurement approach should be applicable to SC-APC connectors. The gradual appearance of interference fringes 20 μm to 25 μm away from contact can serve as a guide for determining where near-contact measurements should be carried out. Additional work is required to understand small shifts in IL after ferrules make contact within the member.

Advantages

The non-contact methods for measuring insertion loss as disclosed herein have a number of advantages. The methods can be used to measure the insertion loss between two components (optical connectors or fibers). This is generally difficult to do accurately unless an index-matching fluid is used as the media between the end faces of the components. The non-contact aspect of the method reduces the risk of damage to the fiber end faces. As a consequence, fewer visual inspections steps are required.

The methods also predict the in-contact insertion loss by extrapolation of the signal to what is determined to be the contact point. The methods employ signatures in the shape of the optical loss curve as a function of end-face gap to predict the contact point location. However, an alternative method for determining the contact point includes the use of multiple wavelengths and the interference fringes generated as a result of reflections from the glass/air interfaces to calculate more accurately the distance between the end faces.

The IL measurement can be made quickly, e.g., in only a few seconds once the DUT is inserted in the system.

The IL measurement methods can reduce the variability of the optical loss measurement compared to the traditional physical contact methods used in the industry.

Aspects of the methods include identifying other losses mechanisms in one or more of the connector components based on an analysis of signature patterns in the measurement to isolate the insertion loss of the DUT connector.

The methods can significantly reduce the cost associated with connector manufacturing inspection by eliminating or reducing the use of connector adapters or specialized reference jumpers.

The methods can employ different types of sensors for monitoring the location of the end faces of the connector components, i.e., the methods are not sensor dependent. As improved distance/location sensors become available, they can be employed in the methods disclosed herein for even greater measurement sensitivity, speed, and/or improved size.

APPENDIX A

SM Fiber Optical Coupling with Misalignment

This Appendix A sets forth the mathematical basis for optical coupling between single-mode fibers under misalignment and is based on the analysis as set forth in the publication by W. Joyce and B. DeLoach, "Alignment of Gaussian beams," Applied Optics, Vol. 23, No. 23, pp. 4187-4196, 1984.

The fundamental mode of a circularly symmetric step index waveguide can be approximated by a Gaussian distribution, where the radial variation in optical intensity I(r, w) varies as $$I(r, w) = \frac{2P}{\pi w^2} \exp\left(-2\frac{r^2}{w^2}\right) \qquad \text{Eq. A.1}$$

where P is the total power carried by the waveguide fundamental mode and w is the fundamental mode beam waist. The beam waist w provides a measure of the half width of the Gaussian beam. At r=w, the beam intensity drops to $1/e^2$ the peak value at r=0.

The beam waist for a step index optical fiber with core radius a, core index $n_1$, and cladding index $n_2$, can be approximated as $$w = a\left(0.65 + 1.619V^{-\frac{3}{2}} + 2.879V^{-6}\right) \qquad \text{Eq. A.2}$$

where $$V^2 = (n_1^2 - n_2^2)k^2 a^2 \qquad \text{Eq. A.3}$$

and $$k = \frac{2\pi}{\lambda} \qquad \text{Eq. A.4}$$

For SMF-28 fiber operating at $\lambda=1.55$ μm the fundamental mode Gaussian distribution has a beam waist w≈5.25 μm.

The transmission of power between two optical waveguides with Gaussian beam waists $w_1$ and $w_2$ can be modeled by calculating an overlap integral for their respective guided mode electric field amplitudes:

$$T = \frac{\left|\iint E_1(r,\phi)E_2^*(r,\phi)drd\phi\right|^2}{\left|\iint E_1(r,\phi)E_1^*(r,\phi)dxdy\right|\left|\iint E_2(r,\phi)E_2^*(r,\phi)drd\phi\right|} \qquad \text{Eq. A.5}$$

where $$E_1(r,\phi) = \sqrt{I(r,w_1)} \text{ and } E_2(r,\phi) = \sqrt{I(r,w_2)}. \qquad \text{Eq. A.6}$$

If the two optical waveguides ends are axial misaligned, the overlap integral may be calculated at any convenient x-y plane along the z axis. For example, a coupling plane may be selected on the end face of the second optical waveguide. In this case, the electric field amplitude distribution for the first waveguide is diffracted across the coupling gap and projected onto the second optical waveguide end. The value of $E_1(r, \phi)$ must be modified to include the effect of this optical beam diffraction. The value of $E_2(r, \phi)$ remains the same.

As light from the first waveguide diffracts along the optical (z) axis, the beam waist increases according to $$w(z) = w_0 \sqrt{1 + \left(\frac{2z}{kw_0^2}\right)^2} \qquad \text{Eq. A.7}$$

where $w_0$ is the minimum beam waist at the end face of the first waveguide. The transverse electric field amplitude for the diffracted beam as it propagates along the z-axis is given by $$E_{1D}(r, \phi, z) = \left(\frac{2}{\pi}\right)^{\frac{1}{4}} w(z)^{-\frac{1}{2}} \exp\left(-\left(\frac{x}{w(z)}\right)^2 + \frac{ikr^2}{2R}\right) \qquad \text{Eq. A.8}$$

where the radius of curvature R of the expanding beam is given by $$R = z\left(1 + \left(\frac{kw_0^2}{2z}\right)^2\right). \qquad \text{Eq. A.9}$$

The amount of light coupled between the first and second waveguides is characterized by an insertion loss IL measured in dB:

$$\text{IL}_{dB} = -10 \log_{10}(T) \qquad \text{Eq. A.10}$$

where T is the fraction of light coupled from one fiber to the other. The mode field overlap integral for T from Eq. 2 can be evaluated in closed form for the Gaussian beams described in the previous section. The resulting coupling model provides a series of transmission coefficients that are associated with the various impairments relating to misalignment and fiber loss $$T = t_a^2 t_x t_y t_{\theta_x} t_{\theta_y} t_f \qquad \text{Eq. A.11}$$

The transmission coefficient associated with axial separation of the waveguides is given by $$t_a = \frac{2}{\sqrt{\left(\frac{w_1}{w_2} + \frac{w_2}{w_1}\right)^2 + \frac{4z^2}{(kw_1 w_2)^2}}}. \qquad \text{Eq. A.12}$$

Lateral misalignments of the optical waveguides in the x- and y-axis change transmission through $$t_x = \exp\left(-\frac{x^2}{d_e^2}\right) \text{ and } t_y = \exp\left(-\frac{y^2}{d_e^2}\right) \text{ with} \qquad \text{Eqs. A.13a-c}$$

$$d_e = \frac{\sqrt{2}}{t_a \sqrt{\frac{1}{w_1^2} + \frac{1}{w_2^2}}}.$$

Similarly, angular misalignments of the optical waveguides in the x-z and y-z planes are described by:

$$t_{\theta_x} = \exp\left(-\frac{\theta_x^2}{\theta_e^2}\right) \text{ and } t_{\theta_y} = \exp\left(-\frac{\theta_y^2}{\theta_e^2}\right) \text{ with} \qquad \text{Eqs. A.14a-c}$$

$$\theta_e = \frac{2^{1.5}}{kt_a \sqrt{w_1^2 + w_2^2}}.$$

If the beam waists for the two waveguides are identical ($w_1 = w_2 = w_0$) then Eq. A.12, A.13c and A.14c can be rewritten as Equations A.15, A.16 and A.17, respectively below.

$$t_a = \frac{2}{\sqrt{\left(\frac{w_1}{w_2} + \frac{w_2}{w_1}\right)^2 + \frac{4z^2}{(kw_1 w_2)^2}}} = \frac{2}{\sqrt{\left(\frac{w_0}{w_0} + \frac{w_0}{w_0}\right)^2 + \frac{4z^2}{(kw_0^2)^2}}} =$$

$$\frac{2}{\sqrt{(2)^2 + \frac{4z^2}{k^2 w_0^4}}} = \frac{2}{2\sqrt{1 + \frac{z^2}{k^2 w_0^4}}} = \frac{1}{\sqrt{1 + \frac{z^2}{k^2 w_0^4}}}$$

$$d_e = \frac{\sqrt{2}}{t_a \sqrt{\frac{1}{w_1^2} + \frac{1}{w_2^2}}} = \frac{\sqrt{2}}{t_a \sqrt{\frac{1}{w_0^2} + \frac{1}{w_0^2}}} =$$

$$\frac{\sqrt{2}}{t_a \sqrt{\frac{2}{w_0^2}}} = \frac{1}{t_a \sqrt{\frac{1}{w_0^2}}} = \frac{w}{t_a} = w\sqrt{1 + \frac{z^2}{k^2 w_0^4}}$$

$$\theta_e = \frac{2^{1.5}}{kt_a \sqrt{w_1^2 + w_2^2}} = \frac{2^{1.5}}{kt_a \sqrt{2w_0^2}} = \frac{2}{kt_a w_0} = \frac{2}{kw_0}\sqrt{1 + \frac{z^2}{k^2 w_0^4}}$$

APPENDIX B

Linear Extrapolation Function

When the z-axis separation between waveguides is sufficiently large the expression for $t_a$ in Eq. A.15a may be simplified. If $$\frac{s^2}{k^2 w_0^4} \gg 1$$

then for conditions where the z-axis separation $z \gg k w_0^2$:

$$t_a \cong \frac{1}{\sqrt{\frac{z^2}{k^2 w_0^4}}} = \frac{1}{\frac{z}{k w_0^2}} = \frac{k w_0^2}{z}. \quad \text{Eq. B.2}$$

This modified expression for $t_a$ is valid at $\lambda=1.55$ μm for $z>100$ μm. Assuming there is no significant contribution to transmission function T(z) from lateral or angular misalignments at large axial separations (validated in Section B.3) it can be written as (from Eq. A.11)

$$T(z) = t_a^2 t_x t_y t_{\theta_x} t_{\theta_y} t_f \quad \text{Eq. B.3}$$

where all transmission misalignment terms except the axial misalignment term are unity.

$$t_x = 1 \quad \text{Eq. B.4}$$
$$t_y = 1$$
$$t_{\theta_x} = 1$$
$$t_{\theta_y} = 1$$

$$T(z) = t_a^2 t_f \cong T(z) = \left(\frac{k w_0^2}{z}\right)^2 t_f = \frac{k^2 w_0^4}{z^2} t_f \quad \text{Eq. B.5}$$

$$T(z) = \frac{k^2 w_0^4}{z^2} t_f$$

From Eq. A.10, the Insertion Loss as a function of axial misalignment z is given by $$IL(z) = -10 \log_{10}(T(z)) \quad \text{Eq. B.6}$$

Rearranging to solve for the transmission function T(z) yields $$T(z) = 10^{-\frac{IL(z)}{10 \, dB}} \quad \text{Eq. B.7}$$

Setting Eq. B.5 equal to Eq. B.7 and solving for z gives $$\frac{k^2 w_0^4}{z^2} t_f = 10^{-\frac{IL(z)}{10 \, dB}} \quad \text{Eq. B.8}$$

$$\frac{1}{z^2} = \frac{1}{k^2 w_0^4 t_f} 10^{-\frac{IL(z)}{10 \, dB}} \quad \text{Eq. B.9}$$

$$z^2 = k^2 w_0^4 t_f 10^{\frac{IL(z)}{10 \, dB}} \quad \text{Eq. B.10}$$

$$z = \sqrt{k^2 w_0^4 t_f 10^{\frac{IL(z)}{10 \, dB}}} = k w_0^2 \sqrt{t_f} \, 10^{\frac{IL(z)}{20 \, dB}} \quad \text{Eq. B.11}$$

Here we assume that IL(z) is known and we are trying to calculate the corresponding z value. This lets us estimate the gap distance based on measured IL values.

Since the interference fringes introduce unwanted ripple in the measured signal we need to replace IL(z) with ILM(z), the curve generated by the set of IL curve minima values. Doing this, we can rewrite the function as where $$z = \alpha 10^{\frac{ILM(z)}{20 \, dB}} \quad \text{Eq. B.12}$$

and α is a relatively constant slope term (depending mainly on fiber link losses, which are typically very low)

$$\alpha = k w_0^2 \sqrt{t_f} \quad \text{Eq. B.13}$$

Since the constant slope term α will not change where Eq. B.11 intercepts the x-axis it can be ignored, resulting in the linear extrapolation function used in the analysis in described above, wherein:

$$STX(z) = 10^{\frac{0 \, dB}{20 \, dB}} \quad \text{Eq. B.14}$$

At contact we expect that ILM(z)=0 dB so that $$STX(z) = 10^{\frac{0 \, dB}{20 \, dB}} = 1 \quad \text{Eq. B.15}$$

Therefore the contact location (z=0) can be predicted by performing a linear extrapolation of STX(z) from measured ILM(z) data far from contact, and determining where the linear fit function intercepts STX=1. If the linear fit has the form y=mz+c, then by setting y=1 fiber contact is expected at stage position z where z=(1−c)/m. It is important to note that this linear extrapolation will only be highly linear using ILM data measured at axial separations greater than about 100 μm. At closer axial separations the STX(z) curve will become slightly non-linear, so that simple correction terms (like the term $z_c$ described above) are required to obtain a more accurate estimate for the fiber contact position. These correction terms apply a constant shift to the predicted value, but as long as the range of z positions over which ILM(z) data points are gathered remains relatively constant, accurate contact position estimates can be made.

Now we provide a check on the assumption presented in Eq. B.4 (transmission misalignment terms except the axial misalignment term are approximately unity). At large z-axis separations the lateral misalignment expressions may be simplified using the same approximation for $t_a$ in Eq. B.2. This changes Eq. A.16 to $$d_e = \frac{w_0}{t_a} \cong \frac{w_0}{\frac{k w_0^2}{z}} = \frac{z}{k w_0} \quad \text{Eq. B.16}$$

so that the transmission factor for lateral misalignments (here in the x direction, but similar for y) is $$t_x = \exp\left(-\frac{x^2}{d_e^2}\right) \cong \exp\left(-\frac{x^2}{\left(\frac{z}{k w_0}\right)^2}\right) \quad \text{Eq. B.16}$$

The form of this equation confirms that for large z-axis separations, coupling between waveguides is relatively insensitive to lateral misalignments (in the x or y direction). It is useful to calculate how large a lateral misalignment may be experienced while still keeping the lateral misalignment transmission term very close to 1.0 (for example $t_z>0.999$). In this case, the exponential term in B.16 becomes:

$$\frac{x^2}{\left(\frac{z}{kw_0}\right)^2} < 0.001 \quad \text{Eq. B.17}$$

so that $$x^2 < 0.001\left(\frac{z}{kw_0}\right)^2$$

and therefore $$x < 0.032\frac{z}{kw_0}$$

For $w_0=5.25$ μm and lambda=1.55 μm, the ratio of lateral to axial misalignment must be $$\frac{x}{z} < 0.001486.$$

Performing a similar analysis for angular misalignments, the approximation for $t_a$ in Eq. B.2 changes Eq. A.17 to $$\theta_e = \frac{2}{kt_a w_0} \cong \frac{2}{kw_0}\frac{kw_0^2}{z} = \frac{2w_0}{z} \quad \text{Eq. B.18}$$

so that the transmission factor for angular misalignments (here in the $\theta_x$ rotation, but similar for $\theta_y$) is $$t_{\theta_x} = \exp\left(-\frac{\theta_x^2}{\theta_e^2}\right) \cong \exp\left(-\frac{\theta_x^2}{\left(\frac{2w_0}{z}\right)^2}\right) \quad \text{Eq. B.19}$$

Again, the form of this equation confirms that for large z-axis separations, coupling between waveguides is relatively insensitive to angular misalignments (in with $\theta_x$ or $\theta_y$ rotations). For $t_{\theta_x}>0.999$ the exponential term in Eq. B.19 is $$\frac{\theta_x^2}{\left(\frac{2w_0}{z}\right)^2} < 0.001 \quad \text{B.20}$$

$$\theta_x^2 < 0.001\left(\frac{2w_0}{z}\right)^2$$

$$\theta_x < 0.032\frac{z}{2w_0}$$

So for $w_0=5.25$ μm and lambda=1.55 μm the rotation in radians must satisfy $\theta_x<0.0003\,z$.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A non-contact method of measuring an insertion loss of a device-under-test (DUT) jumper cable with a system that includes a reference jumper cable, wherein an end of the DUT jumper cable includes a first DUT connector having a first ferrule with a first optical fiber and a first end face, wherein an end of the reference jumper cable includes a reference connector having a second ferrule with a second optical fiber and a second end face, the method comprising:
   (a) optically coupling a remote end of the DUT jumper cable that is opposite the end with the first DUT connector to a detector of the system;
   (b) axially aligning the first and second ferrules so that the first and second end faces are confronting and spaced apart to define a gap with an axial gap distance d;
   (c) measuring values of the insertion loss between the first and second optical fibers for different gap distances d>0, wherein light is passed through the reference jumper cable and the DUT jumper cable and measured by the detector when measuring values of the insertion loss such that the insertion loss represents a total jumper cable insertion loss;
   (d) calculating a contact position where the first and second end faces are expected to come into contact so that there is a gap distance of d=0, wherein the calculating of the contact position is based on the measured values of the insertion loss when d>0; and
   (e) after the calculating of the contact position, estimating a value for the insertion loss for the gap distance of d=0 based on the measured values of the insertion loss when d>0.

2. The method according to claim 1, wherein the first and second ferrules are operably disposed in an alignment member.

3. The method according to claim 2, wherein the alignment member comprises a ceramic, metal or any other material sleeve.

4. The method according to claim 1, wherein the measuring of the values of the insertion loss includes sending light from the first optical fiber to the second optical fiber through the gap.

5. The method according to claim 1, wherein the different gap distances are established by axially moving the reference connector relative to the first DUT connector or the first DUT connector relative to the reference connector.

6. The method according to claim 1, wherein the first DUT connector is one selected from the group of connectors comprising: SC, LC, MTP, MT-RJ, UPC and APC.

7. The method according to claim 1, wherein the calculating of the contact position is comprised of calculating a contact position of the reference connector where the first and second end faces are expected to come into contact.

8. The method according to claim 7, wherein the calculating of the contact position of the reference connector includes using a polynomial extrapolation of the measured values of the insertion loss.

9. The method according to claim 7, wherein the calculating of the contact position of the reference connector is based on projections of insertion-loss slope and its first and second derivatives.

10. The method according to claim 7, wherein the estimating of the value for the insertion loss for the gap distance of d=0 is based on a curve fit of the insertion loss versus the gap distance for gap distances greater than zero.

11. The method according to claim 7, wherein the estimating of the value for the insertion loss for the gap distance of d=0 is based on either a linear or a polynomial extrapolation of the insertion loss versus the gap distance for gap distances greater than zero.

12. The method according to claim 1, wherein the measured values of the insertion loss exhibit measurement noise due to interference effects, and further comprising applying a filter to the measured values of the insertion loss to reduce the measurement noise.

13. The method according to claim 1, wherein the first and second optical fibers are either both single-mode fibers or both multimode fibers.

14. The method according to claim 1, wherein the remote end of the DUT jumper cable includes a second DUT connector having a ferrule that is similar to the first DUT connector, the method further comprising:
   optically de-coupling the remote end of the DUT jumper cable from the detector;
   optically coupling the first DUT connector to the detector; and
   repeating steps (b)-(e) with the second DUT connector being used instead of the first DUT connector.

15. The method according to claim 1, wherein the system further includes a laser source optically coupled to a splitter, a reference detector optically coupled to the splitter, and a reference power meter electrically connected to the reference detector, the method further comprising:
   optically coupling a remote end of the reference jumper cable that is opposite the end with the reference connector to the splitter.

16. A non-contact method of measuring an insertion loss of a device-under-test (DUT) jumper cable with a system that includes a reference juniper cable, Wherein an end of the DUT juniper cable includes a DUT connector having a first ferrule with a first optical fiber and a first end face, wherein an end of the reference jumper cable includes a reference connector having a second ferrule with a second optical fiber and a second end face, the method comprising:
   optically coupling a remote end of the DUT jumper cable that is opposite the end with the DUT connector to a detector of the system;
   axially aligning the first and second ferrules so that the first and second end faces are confronting and spaced apart to define a gap with an axial gap distance d;
   measuring values of the insertion loss between the first and second optical fibers for different gap distances d>0, wherein light is passed through the reference jumper cable and the DUT jumper cable and measured by the detector when measuring values of the insertion loss such that the insertion loss represents a total jumper cable insertion loss that includes a DUT jumper cable fiber link insertion loss and a DUT connector insertion loss;
   calculating, a contact position where the first and second end faces are expected to come into contact so that there is a gap distance of d=0, wherein the calculating, of the contact position is based on the measured values of the insertion loss when d>0;
   after the calculating of the contact position, estimating a value for the insertion loss for the gap distance of d=0 based on the measured values of the insertion loss when d>0; and
   accounting for the DUT jumper cable fiber link insertion loss in the estimated value for the insertion loss for the gap distance of d=0.

17. The method according to claim 16, wherein accounting for the DUT jumper cable fiber link insertion loss comprises:
   differentiating the DUT jumper cable fiber link insertion loss from the DUT connector insertion loss by detecting a shift from an expected insertion loss curve toward higher loss values, wherein the insertion loss curve is based on a range of gap distances.

18. The method according to claim 16, further comprising:
   generating a curve of the measured values for insertion loss over a range of gap distances; and
   estimating a lateral offset between the first and second ferrules by matching the shape of the curve of the measured values for insertion loss to the shape of an expected insertion loss curve for a given lateral misalignment condition.

19. The method according to claim 18, further comprising:
   determining a predicted value for insertion loss based on the estimated lateral offset; and
   comparing the predicted value for insertion loss and the estimated value for the insertion loss for the gap distance of d=0 to estimate the DUT jumper cable fiber link insertion loss.

20. A non-contact method of measuring an insertion loss of a device-under-test (DUT) jumper cable with a system that includes a reference jumper cable, Wherein an end of the DUT juniper cable includes a DST connector having a first ferrule with a first optical fiber and a first end face, wherein an end of the reference jumper cable includes a reference connector having, a second ferrule with a second optical fiber and a second end face, the method comprising:
   optically coupling a remote end of the DUT jumper cable that is opposite the end with the MT connector to a detector of the system;
   axially aligning the first and second ferrules so that the first and second end faces are confronting and spaced apart to define a gap with an axial gap distance d;
   measuring values of the insertion loss between the first and second optical fibers for a first range of different gap distances d>0, wherein light is passed through the reference jumper cable and the DUT jumper cable and measured with the detector when measuring values of the insertion loss such that the insertion loss represents a total jumper cable insertion loss that includes a DUT juniper cable fiber link insertion loss and a DUT connector insertion loss;
   after the measuring of the values of the insertion loss between the first and second optical fibers for the first range of different gap distances d>0, calculating a first prediction of a contact position where the first and second end faces are expected to come into contact so that there is a gap distance of d=0, wherein the calculating of the first prediction of the contact position is based on the measured values of the insertion loss for the first range of different gap distances d>0;
   after the calculating of the first prediction of the contact position, measuring values of the insertion loss between the first and second optical fibers for a second range of different gap distances d>0, wherein the second range of different gap distances d>0 is smaller than the first range of different gap distances d>0;
   after the measuring of the values of the insertion loss between the first and second optical fibers for the second range of different gap distances d>0, calculating a second prediction of a contact position where the first and second end faces are expected to come into contact so that there is a gap distance of d=0, wherein the calculating of the second prediction of the contact position is based on the measured values of the insertion loss for the second range of different gap distances d>0; and after the calculating of the second prediction of the contact position, estimating a value for the insertion loss for the gap distance of d=0 based on the measured values of the insertion loss for the second range of different gap distances d>0.

21. The method according to claim 20, further comprising:
accounting for the DUT jumper cable fiber link insertion loss in the estimated value for the insertion loss.

22. The method according to claim 21, wherein accounting for the DUT jumper cable fiber link insertion loss comprises differentiating the DUT jumper cable fiber link insertion loss from the DUT connector insertion loss by detecting a shift from an expected insertion loss curve toward higher loss values to provide a first estimate of the DUT jumper cable fiber link insertion loss, wherein the insertion loss curve is based on gap distances in the first range of gap distances.

23. The method according to claim 22, further comprising:
generating a curve of the measured values for insertion loss over the second range of gap distances; and
estimating a lateral offset between the first and second ferrules by matching the shape of the curve of the measured values for insertion loss to the shape of an expected insertion loss curve for a given lateral misalignment condition.

24. The method according to claim 23, further comprising:
determining a predicted value for insertion loss based on the estimated lateral offset; and
comparing the predicted value for insertion loss and the estimated value for the insertion loss for the gap distance of d=0 to provide a second estimate of the DUT jumper cable fiber link insertion loss.

* * * * *